United States Patent
Otonari

(10) Patent No.: US 10,111,183 B2
(45) Date of Patent: Oct. 23, 2018

(54) METHOD OF CONTROLLING POWER AND WIRELESS COMMUNICATION SYSTEM

(71) Applicant: FUJITSU LIMITED, Kawasaki-shi, Kanagawa (JP)

(72) Inventor: Junji Otonari, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/617,708

(22) Filed: Jun. 8, 2017

(65) Prior Publication Data

US 2018/0041968 A1  Feb. 8, 2018

(30) Foreign Application Priority Data

Aug. 4, 2016  (JP) .................... 2016-153913

(51) Int. Cl.
| | | |
|---|---|---|
| H04B 7/00 | (2006.01) | |
| H04W 52/24 | (2009.01) | |
| H04W 52/14 | (2009.01) | |
| H04W 52/16 | (2009.01) | |
| H04W 52/40 | (2009.01) | |

(52) U.S. Cl.
CPC ....... H04W 52/241 (2013.01); H04W 52/143 (2013.01); H04W 52/16 (2013.01); H04W 52/243 (2013.01); H04W 52/40 (2013.01)

(58) Field of Classification Search
CPC . H04W 52/143; H04W 52/16; H04W 52/241; H04W 52/243; H04W 52/40
USPC ... 455/522, 69, 67.11, 442, 422.1, 432, 517, 455/405, 452.2; 370/252, 312, 328, 329; 709/202
See application file for complete search history.

(56) References Cited

U.S. PATENT DOCUMENTS

| | | | | |
|---|---|---|---|---|
| 9,838,974 | B2 * | 12/2017 | Shimezawa | H04W 52/16 |
| 2002/0098860 | A1 * | 7/2002 | Pecen | H03G 3/3036 |
| | | | | 455/522 |
| 2003/0003937 | A1 * | 1/2003 | Ohkubo | H04B 7/0608 |
| | | | | 455/517 |
| 2006/0165032 | A1 * | 7/2006 | Hamalainen | H04B 7/022 |
| | | | | 370/328 |

(Continued)

FOREIGN PATENT DOCUMENTS

| | | | |
|---|---|---|---|
| JP | 2007-151167 A | 6/2007 | |
| JP | 2008-529375 A | 7/2008 | |

(Continued)

Primary Examiner — Tan H Trinh
(74) Attorney, Agent, or Firm — Arent Fox LLP

(57) ABSTRACT

A method includes identifying a first quality of a first signal transmitted from a first terminal device to a first base station, executing a first determination to identify whether the first quality is larger than or equal to a first value, transmitting a first result of the first determination to a control apparatus, identifying a second quality of a second signal transmitted from a second terminal device to a second base station, executing a second determination to identify whether the second quality is larger than or equal to a second value, transmitting a second result of the second determination to the control apparatus, and when the first result indicates that the first quality is less than the first value, and the second result indicates that the second quality is larger than or equal to the second value, the first base station executes transmission power control of the first signal.

16 Claims, 31 Drawing Sheets

(56) References Cited

U.S. PATENT DOCUMENTS

| | | | | |
|---|---|---|---|---|
| 2007/0218909 A1* | 9/2007 | Deng | H04W 16/00 | 455/442 |
| 2008/0004020 A1* | 1/2008 | Yasuda | H04W 36/0083 | 455/436 |
| 2008/0032731 A1* | 2/2008 | Shen | H04W 52/346 | 455/522 |
| 2008/0057934 A1* | 3/2008 | Sung | H04W 52/243 | 455/422.1 |
| 2008/0125137 A1* | 5/2008 | Rajkotia | H04L 1/0002 | 455/452.2 |
| 2009/0017859 A1* | 1/2009 | Seppinen | H04W 52/243 | 455/522 |
| 2009/0213802 A1* | 8/2009 | Miki | H04B 7/2621 | 370/329 |
| 2010/0304753 A1 | 12/2010 | Furuya | | |
| 2012/0282889 A1* | 11/2012 | Tanaka | H04J 11/0053 | 455/405 |
| 2013/0012257 A1* | 1/2013 | Kimura | H04W 52/283 | 455/522 |
| 2014/0003320 A1* | 1/2014 | Etemad | H04W 4/06 | 370/312 |
| 2014/0105110 A1* | 4/2014 | Hoshino | H04W 52/18 | 370/328 |
| 2014/0122561 A1* | 5/2014 | Kiyoshige | H04W 88/06 | 709/202 |
| 2014/0315594 A1* | 10/2014 | Jeong | H04W 52/146 | 455/522 |
| 2015/0043485 A1* | 2/2015 | Masuda | H04W 52/346 | 370/329 |
| 2015/0049622 A1* | 2/2015 | Kim | H04L 5/0053 | 370/252 |
| 2015/0140926 A1* | 5/2015 | Fujio | H04B 7/15528 | 455/7 |
| 2015/0304958 A1* | 10/2015 | Wu | H04W 52/246 | 455/522 |
| 2016/0150432 A1* | 5/2016 | Qin | H04W 24/10 | 370/252 |
| 2016/0255550 A1* | 9/2016 | Narita | H04W 36/0094 | 455/67.11 |
| 2017/0079048 A1* | 3/2017 | Yamada | H04L 1/00 | |
| 2017/0150454 A1* | 5/2017 | Zhang | H04W 52/146 | |
| 2017/0164299 A1* | 6/2017 | Shimezawa | H04W 52/16 | |
| 2017/0195931 A1* | 7/2017 | Mitsui | H04W 28/08 | |
| 2017/0215155 A1* | 7/2017 | Nogami | H04W 52/322 | |
| 2017/0230917 A1* | 8/2017 | Ouchi | H04W 52/367 | |
| 2017/0245183 A1* | 8/2017 | Ankel | H04W 36/0083 | |
| 2018/0041911 A1* | 2/2018 | Wen | H04W 24/08 | |

FOREIGN PATENT DOCUMENTS

| | | |
|---|---|---|
| JP | 2011-166435 A | 8/2011 |
| WO | WO 2009/072178 A1 | 6/2009 |

* cited by examiner

FIG. 10

| TERMINAL ID | TARGET RECEPTION QUALITY | RECEPTION QUALITY | TRANSMISSION POWER | GROUP |
|---|---|---|---|---|
| ⋮ | ⋮ | ⋮ | ⋮ | ⋮ |

FIG. 11

| GROUP TYPE | TRANSMISSION POWER | RECEPTION QUALITY |
|---|---|---|
| GROUP A | ≧THRESHOLD VALUE | <TARGET RECEPTION QUALITY |
| GROUP B | ≧THRESHOLD VALUE | ≧TARGET RECEPTION QUALITY |
| GROUP C | <THRESHOLD VALUE | |

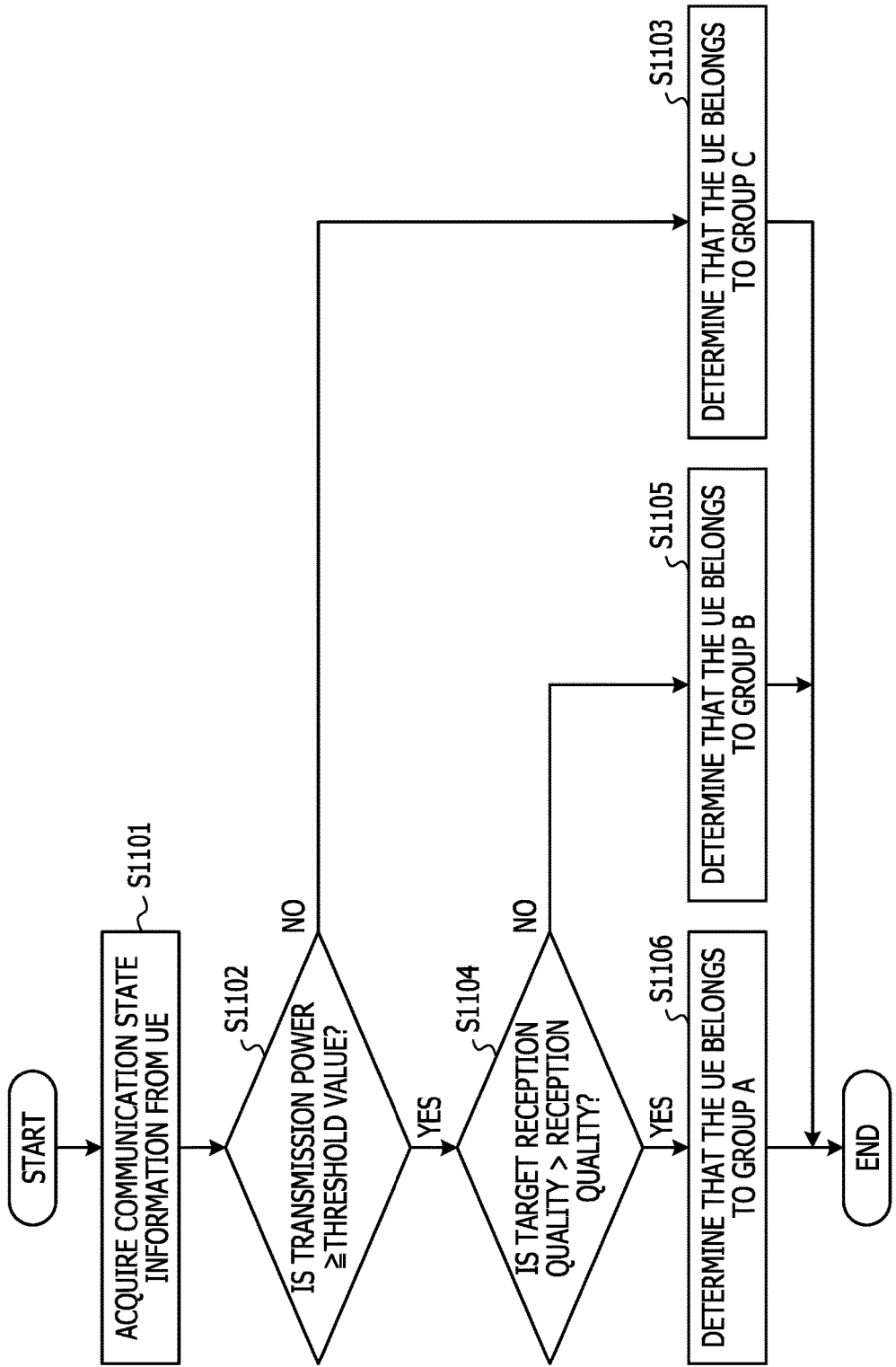

FIG. 15

| BASE STATION ID | GROUP A TERMINAL NUMBER | GROUP B TERMINAL NUMBER | GROUP C TERMINAL NUMBER |
|---|---|---|---|
| ⋮ | ⋮ | ⋮ | ⋮ |

FIG. 18

| GROUP TYPE | RSRP OF ADJACENT BASE STATIONS | RECEPTION QUALITY |
|---|---|---|
| GROUP A | ≧THRESHOLD VALUE | <TARGET RECEPTION QUALITY |
| GROUP B | ≧THRESHOLD VALUE | ≧TARGET RECEPTION QUALITY |
| GROUP C | <THRESHOLD VALUE | |

FIG. 21

| TERMINAL ID | TARGET RECEPTION QUALITY | RECEPTION QUALITY | TARGET TRANSMISSION POWER | TRANSMISSION POWER | SATURATION START POWER | GROUP |
|---|---|---|---|---|---|---|
| ... | ... | ... | ... | ... | ... | ... |

FIG. 26

| BASE STATION ID | AMOUNT OF INTERFERENCE | GROUP A TERMINAL NUMBER | GROUP B TERMINAL NUMBER | GROUP C TERMINAL NUMBER |
|---|---|---|---|---|
| ... | | ... | ... | ... |

METHOD OF CONTROLLING POWER AND WIRELESS COMMUNICATION SYSTEM

CROSS-REFERENCE TO RELATED APPLICATION

This application is based upon and claims the benefit of priority of the prior Japanese Patent Application No. 2016-153913, filed on Aug. 4, 2016, the entire contents of which are incorporated herein by reference.

FIELD

The embodiments discussed herein are related to a method of controlling power and a wireless communication system.

BACKGROUND

In the LTE system of the 3GPP specification, which is one of radio communication specifications, a mobile terminal (UE) controls a transmission power based on a TPC command transmitted from a base station (eNB) in an uplink communication between the eNB and the UE. The 3GPP is an abbreviation for the third generation partnership project, and the LTE is an abbreviation for the long term evolution. The eNB is an abbreviation for the evolved node B, the UE is an abbreviation for the user equipment, and the TPC is an abbreviation for the transmission power control.

In other words, the UE is controlled in a closed loop, and a transmission power (physical uplink shared channel (PUSCH) transmission power) of the uplink data transmission is controlled based on an cumulative value of offset values specified by a TPC command transmitted from the eNB.

In radio communication systems such as a recent mobile phone network, an examination is in progress on a heterogeneous network where a small base station forming a small radio cell (radio area) called a femtocell area is disposed in a general home and office. By installing a femtocell base station, a femtocell area is formed within an area of an outdoor macro cell, and thereby quality improvement of indoor mobile phone services and expansion of the service area are expected. Further, a radio traffic offload effect in an outdoor macro cell base station is expected. Related techniques are disclosed in, for example, Japanese National Publication of International Patent Application No. 2008-529375, International Publication Pamphlet No. WO 2009/72178, and Japanese Laid-open Patent Publication Nos. 2007-151167 and 2011-166435.

SUMMARY

According to an aspect of the invention, a method of controlling power includes identifying, by the first base station, a first signal quality of a first signal transmitted from a first terminal device to a first base station, executing, by the first base station, a first determination to identify whether the first signal quality is larger than or equal to a first value set for the first terminal device, transmitting, by the first base station, a first result of the first determination to a control apparatus, identifying, by the second base station, a second signal quality of a second signal transmitted from a second terminal device to a second base station, executing, by the second base station, a second determination to identify whether the second signal quality is larger than or equal to a second value set for the second terminal device, transmitting, by the second base station, a second result of the second determination to the control apparatus, and when the first result indicates that the first signal quality is less than the first value, and the second result indicates that the second signal quality is larger than or equal to the second value, causing the first base station to execute transmission power control of the first signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an example of a table in which identification information of the UE is associated with information of the target reception quality, information of the reception quality, transmission power value, and identification information of the group;

FIG. 11 is a diagram illustrating an example of a reference for classifying the UE to three groups;

FIG. 12 is a flowchart of a processing of performing a group determination of the UE by a group determination unit in the first embodiment;

FIG. 15 is a diagram in a table format illustrating an example of information indicating the number of UEs belonging to respective groups for each of eNBs in the first embodiment;

FIG. 18 is a diagram illustrating an example of a reference for classifying the UE to four groups;

FIG. 21 is a diagram in a table format illustrating an example of information stored by the eNB to respond to control by group control information for four groups;

FIG. 26 is a diagram in a table format illustrating an example of information indicating the number of UEs belonging to respective groups for each of eNBs in the third embodiment;

DESCRIPTION OF EMBODIMENTS

Figure 1:
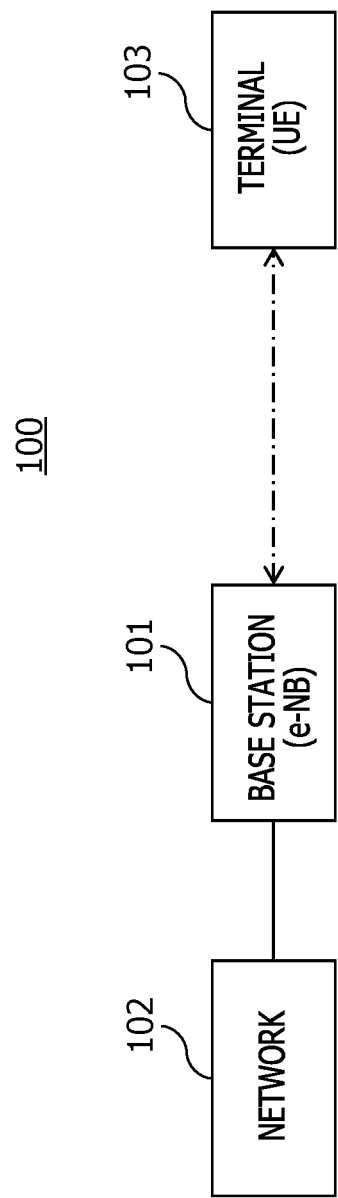
FIG. 1 is an overall configuration view of a radio communication system.

When a communication service is provided by installing a plurality of base stations (for example, femtocell base stations) in an area such as one office floor, a radio signal transmitted by a mobile terminal to a base station may sometimes interfere with a radio signal transmitted by another mobile terminal to another base station. For example, a radio signal transmitted by a mobile terminal A to a base station B for uplink communication may sometimes interfere with a radio signal transmitted by a mobile terminal C to a base station D for uplink communication. Reversely, a radio signal transmitted by the mobile terminal C to the base station D for uplink communication may sometimes interfere with a radio signal transmitted by the mobile terminal A to the base station B. Also, interaction between the base station B and the mobile terminal C and between the base station D and the mobile terminal A may cause deterioration of the signal quality received by both base stations B and D beyond expectation, and this may result in deterioration of uplink communication performance.

Hereinafter, embodiments are described with reference to the accompanying drawings. However, embodiments described hereinafter are merely illustrative, and there is no intention to exclude various modifications and techniques not specified hereinafter. Throughout drawings used for the embodiments described below, a part assigned with the same reference numeral represents the same or similar part, unless otherwise specified. In a case where there are multiple parts having the same configuration, respective parts may be discriminated by assigning #k (k is a natural number) to the reference numeral. When describing parts of the same reference numeral assigned with #k without discrimination, #k may be omitted.

First Embodiment

FIG. 1 is an overall configuration view of a radio communication system 100. The radio communication system 100 includes a base station (eNB) 101, a network 102 coupled with the eNB 101, and a mobile terminal (UE) 103 configured to communicate with the eNB 101. The network 102 is, for example, a trunk line network such as the core network. Upon receiving data addressed to the UE 103 from the network 102, the eNB 101 transmits the received data to the UE 103. Also, the eNB 101 transmits data addressed to the network 102 to the network 102, the data being received from the UE 103 using a radio signal. Also, the eNB 101 generates a signal for controlling the UE 103, and transmits the generated signal to the UE 103.

The eNB 101 is supposed to be mainly a femtocell base station or pico cell base station, that is configured to cover a small radio communication area within a large radio communication area covered by a macro cell base station. Thus, a base station control apparatus may be sometimes disposed between the eNB 101 and the network 102. The UE 103 is supposed to be mainly a mobile phone, a smartphone, or other devices configured to perform mobile communication.

The eNB 101 performs closed loop control of the transmission power when the UE 103 transmits a radio signal toward the eNB 101. In other words, transmission power $P_{PUSCH}(i)$ of a first UE 103 is determined by a formula given below:

[formula 1]
$$P_{PUSCH}(i) = \min\left\{\begin{array}{l} P_{CMAX}(i), \\ 10\log_{10}(M_{PUSCH}(i)) + P_{O\_PUSCH}(j) + \alpha(j) \cdot PL + \Delta_{TF}(i) + f(i) \end{array}\right\}$$

wherein $P_{CMAX}(i)$ is the maximum transmittable power of an ith UE 103; $M_{PUSCH}$ is a transmission bandwidth; $P_{O\_PUSCH}$ is a target power; α is a path loss compensation coefficient; PL is a path loss; $\Delta_{TF}(i)$ is an offset based on modulation and coding scheme (MCS); and f(i) is a cumulative value of the TPC offset value.

When a power control instruction including the TPC offset value is transmitted to the UE 103 by the eNB 101, increase or decrease of the cumulative value f of the TPC offset value becomes controllable, and increase or decrease of the transmission power value of the UE 103 by the eNB 101 becomes controllable.

Figure 2:
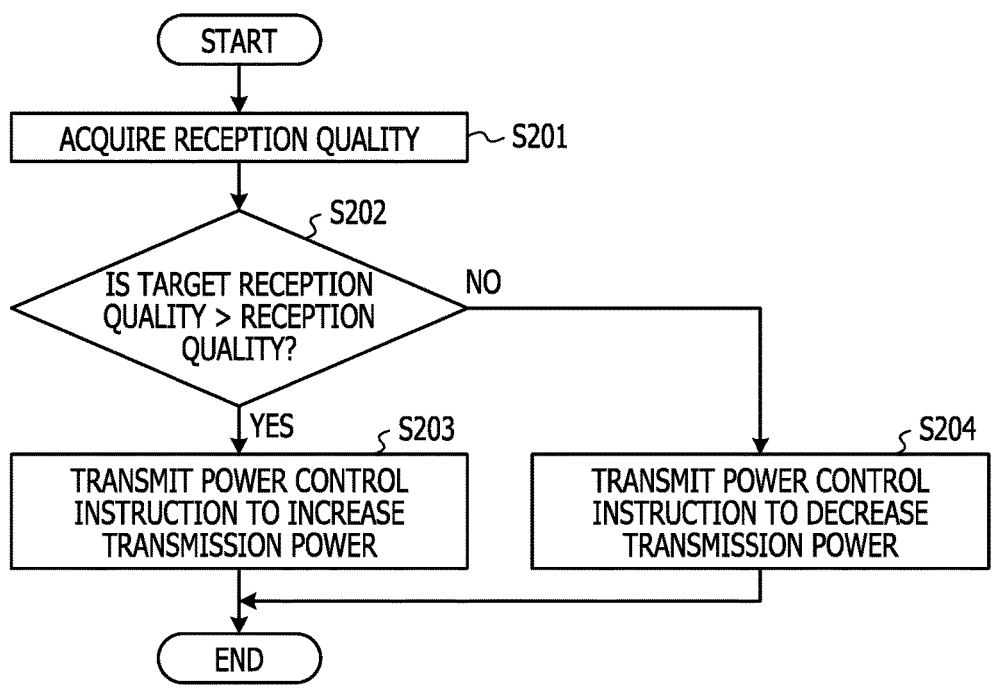
FIG. 2 is a flowchart of a processing of an uplink transmission power control of a UE by an eNB.

FIG. 2 illustrates a flowchart of a processing for uplink transmission power control of the UE 103 by the eNB 101. In step S201, the eNB 101 measures and acquires reception quality of an uplink signal transmitted by the UE 103. The reception quality may be represented by, for example, a signal to interference (SIR) value. The eNB 101 determines target reception quality for each of UEs 103. For example, the target reception quality may be determined as a minimum reception quality with the communication error ratio smaller than or equal to a predetermined value. In step S202, the eNB 101 compares the target reception quality and reception quality acquired in step S201 with each other.

If the reception quality is inferior to the target reception quality as a result of the comparison in step S202 (step S202: YES), the eNB 101 proceeds the processing to step S203 and transmits a control instruction to increase transmission power of the UE 103 for improving the reception quality. For example, the eNB 101 transmits a TPC command which increases the transmission power of the UE 103 by 1 dB.

Reversely, if the reception quality is not inferior to the target reception quality as a result of the comparison in step S202 (step S202: NO), the eNB 101 proceeds the processing to step S204 and transmits a control instruction to decrease transmission power of the UE 103 for reducing useless transmission power. For example, the eNB 101 transmits a TPC command which decreases the transmission power of the UE 103 by 1 dB.

Figure 3:
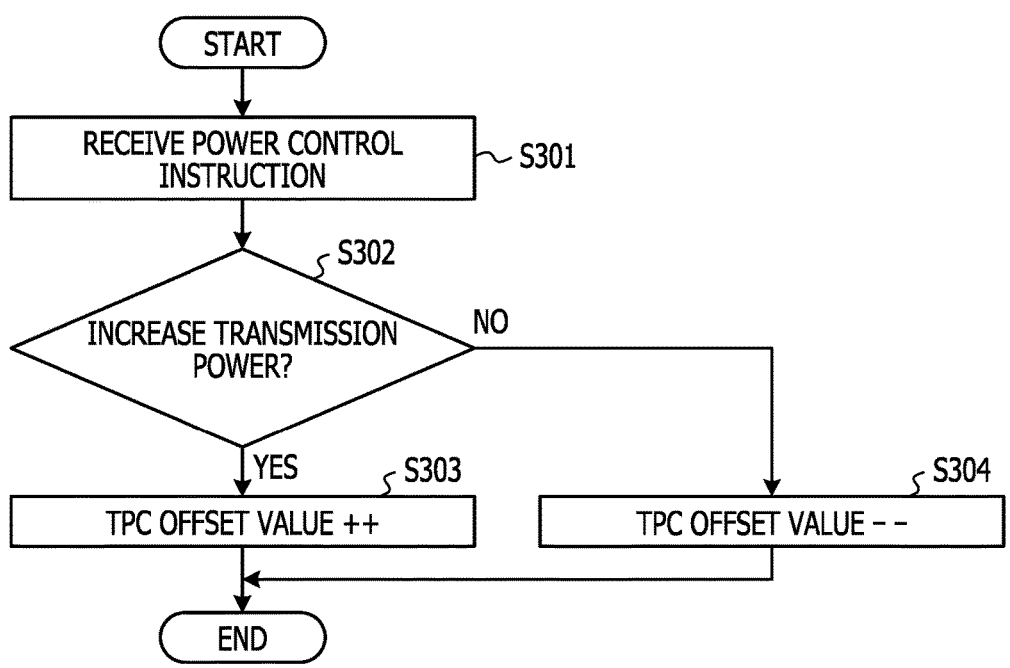
FIG. 3 is a flowchart for the UE to control an uplink transmission power in response to an uplink transmission power control instruction from the eNB.

FIG. 3 is a flowchart for the UE 103 to control the transmission power in response to a transmission power control instruction from the eNB 101. In step S301, the UE 103 receives a power control instruction from the eNB 101. In step S302, the UE 103 determines whether the received power control instruction is an instruction to increase the transmission power.

In step S302, when determined that the received power control instruction is an instruction to increase the transmission power (step S302: YES), the UE 103 proceeds the processing to step S303 and increases the TPC offset value (in the case of FIG. 3, the value of the above f is increased by 1). In step S302, when determined that the received power control instruction is an instruction to decrease the transmission power (step S302: NO), the UE 103 proceeds the processing to step S304 and decreases the TPC offset value (in the case of FIG. 3, the value of the above f is decreased by 1).

Figure 4A:
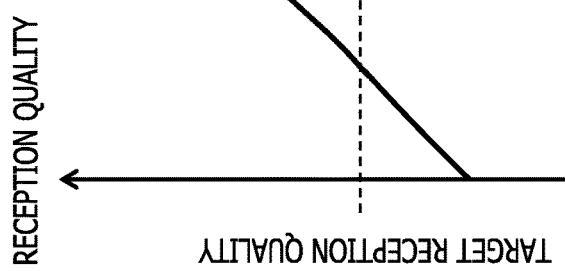
FIG. 4A is a sequence diagram of an example of a communication between the eNB and the UE.

FIG. 4A is a sequence diagram of an example of the communication between the UE 103 and eNB 101. In step S401, the UE 103 transmits an uplink signal to the eNB 101. Upon receiving the uplink signal, the eNB 101 implements processings of the flowchart illustrated in FIG. 2, and in step S402, the eNB 101 transmits the power control instruction to the UE 103. Upon receiving the power control instruction, the UE 103 implements processings of the flowchart illustrated in FIG. 3 and controls the transmission power. In step S403, the UE 103 transmits an uplink signal to the eNB 101 with a controlled transmission power.

Upon receiving the uplink signal, the eNB 101 implements processings of the flowchart illustrated in FIG. 2 again, and in step S404, the eNB 101 transmits the power control instruction to the UE 103. Upon receiving the power control instruction, the UE 103 implements processings of the flowchart illustrated in FIG. 3 and controls the transmission power. In step S405, the UE 103 transmits an uplink signal to the eNB 101 with a controlled transmission power. Then, upon receiving the uplink signal, the eNB 101 implements processings of the flowchart illustrated in FIG. 2, and in step S406, the eNB 101 transmits the power control instruction to the UE 103.

Figure 4B:
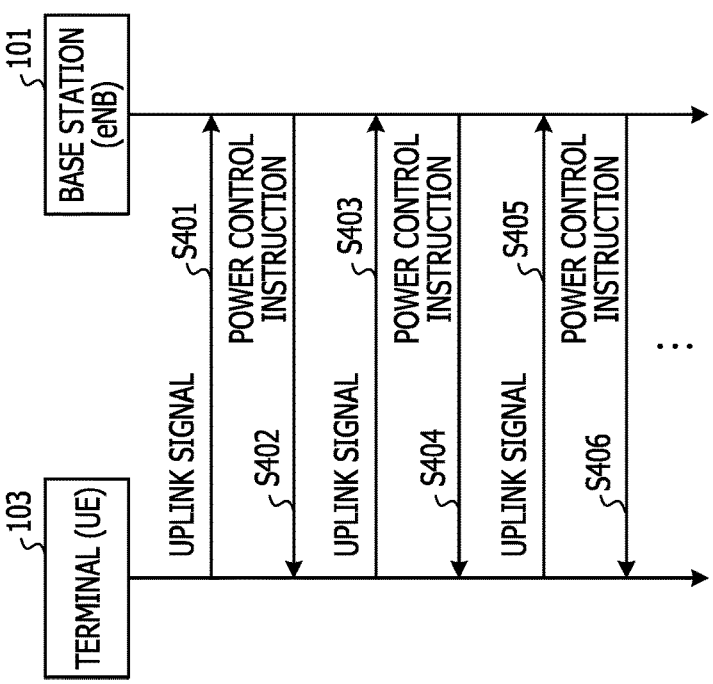
FIG. 4B is a graph illustrating an example of convergence of a reception quality to a target reception quality as time elapses.

Thereafter, the processings are repeated in the same manner. That is, a loop that the eNB 101 transmits the power control instruction to the UE 103 based on the reception quality, and the UE 103 transmits an uplink signal with a transmission power controlled according to the power control instruction is repeated. As a result, the reception quality may be turned to the target reception quality as time elapses as illustrated in FIG. 4B. In other words, when the reception quality is inferior to the target reception quality of the uplink signal from the UE 103, the eNB 101 controls so as to increase the transmission power of the UE 103, and when the reception quality is not inferior to the target reception quality, the eNB 101 controls so as to decrease the transmission power of the UE 103. Thus, a divergence between the reception quality and the target reception quality may be reduced as time elapses, and thereby the reception quality may be converged to the target reception quality.

Figure 5:
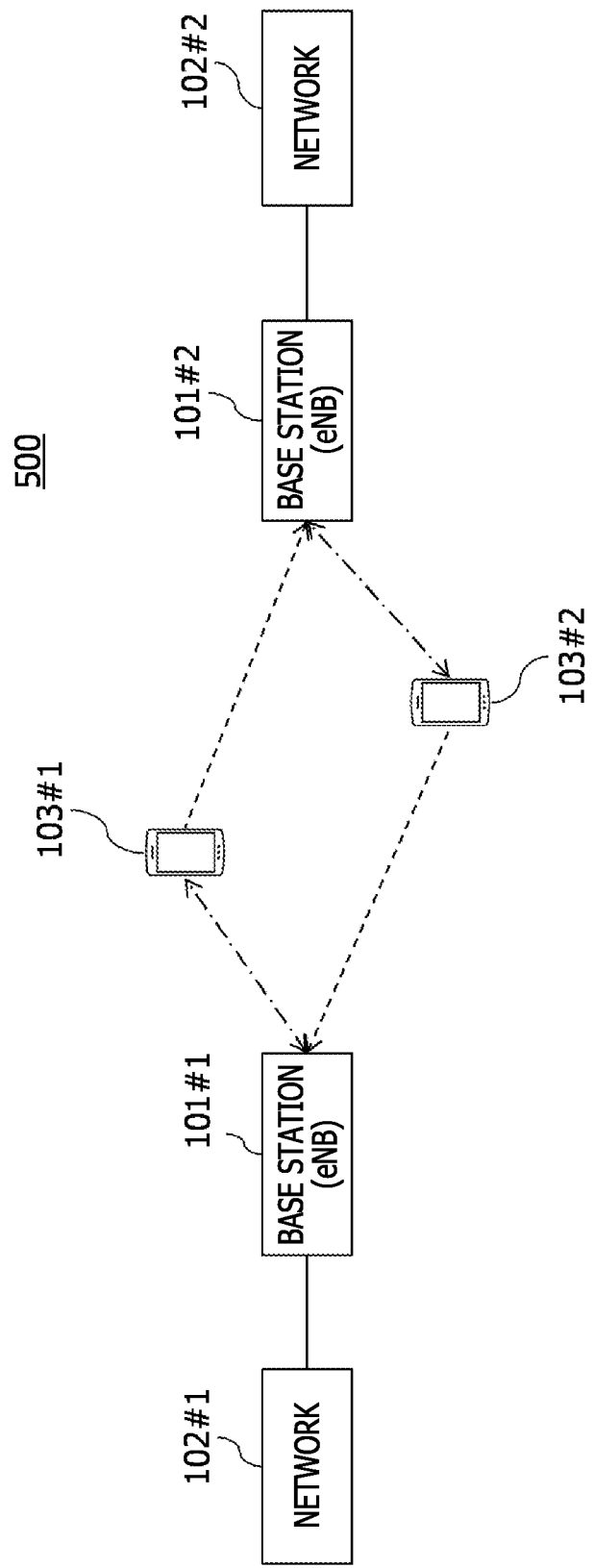
FIG. 5 is an overall configuration view of a radio communication system.

Next, a case where reception quality may be maintained in a deteriorated state due to interaction between a plurality of eNBs 101 and a plurality of UEs 103 is described. Assume that the plurality of eNBs 101 are disposed in a relatively narrow area such as in one office floor, and each of the plurality of eNBs communicate with the UE 103. FIG. 5 is an overall configuration view of a radio communication system 500 in which the eNBs 101#1 and 101#2 are disposed on one floor like above and each of the eNBs communicates with UEs 103#1 and 103#2.

In FIG. 5, the eNB 101#1 and eNB 101#2 are coupled with the networks 102#1 and 102#2 respectively. The networks 102#1 and 102#2 may be different networks or the same network.

As indicated by a single dot chain line between the UE 103#1 and the eNB 101#1, the UE 103#1 communicates with the eNB 101#1. As indicated by a single dot chain line between the UE 103#2 and the eNB 101#2, the UE 103#2 communicates with the eNB 101#2. Thus, as illustrated with FIGS. 2 and 3, the transmission power of the UE 103#1 is controlled by the eNB 101#1, and the transmission power of the UE 103#2 is controlled by the eNB 101#2 individually. However, when the transmission power of each of the UE 103#1 and UE 103#2 is individually controlled so as to converge to the target reception quality as described below, convergence to the target reception quality may not be achieved, and reversely, the transmission power may be controlled so as to diverge.

As the eNB 101#1 and eNB 101#2 are disposed in a relatively narrow area, the uplink signal transmitted to the eNB 101#1 by the UE 103#1 is also received by the eNB 101#2 as indicated by a dotted line of FIG. 5. Thus, the uplink signal of the UE 103#1 is received by the eNB 101#2 as an uplink interference signal that interferes with an uplink signal received by the UE 103#2. In the same manner, the uplink signal transmitted to the eNB 101#2 by the UE 103#2 is also received by the eNB 101#1. Thus, the uplink signal of the UE 103#2 is received by the eNB 101#1 as an uplink interference signal that interferes with an uplink signal received by the UE 103#1.

Figure 6:
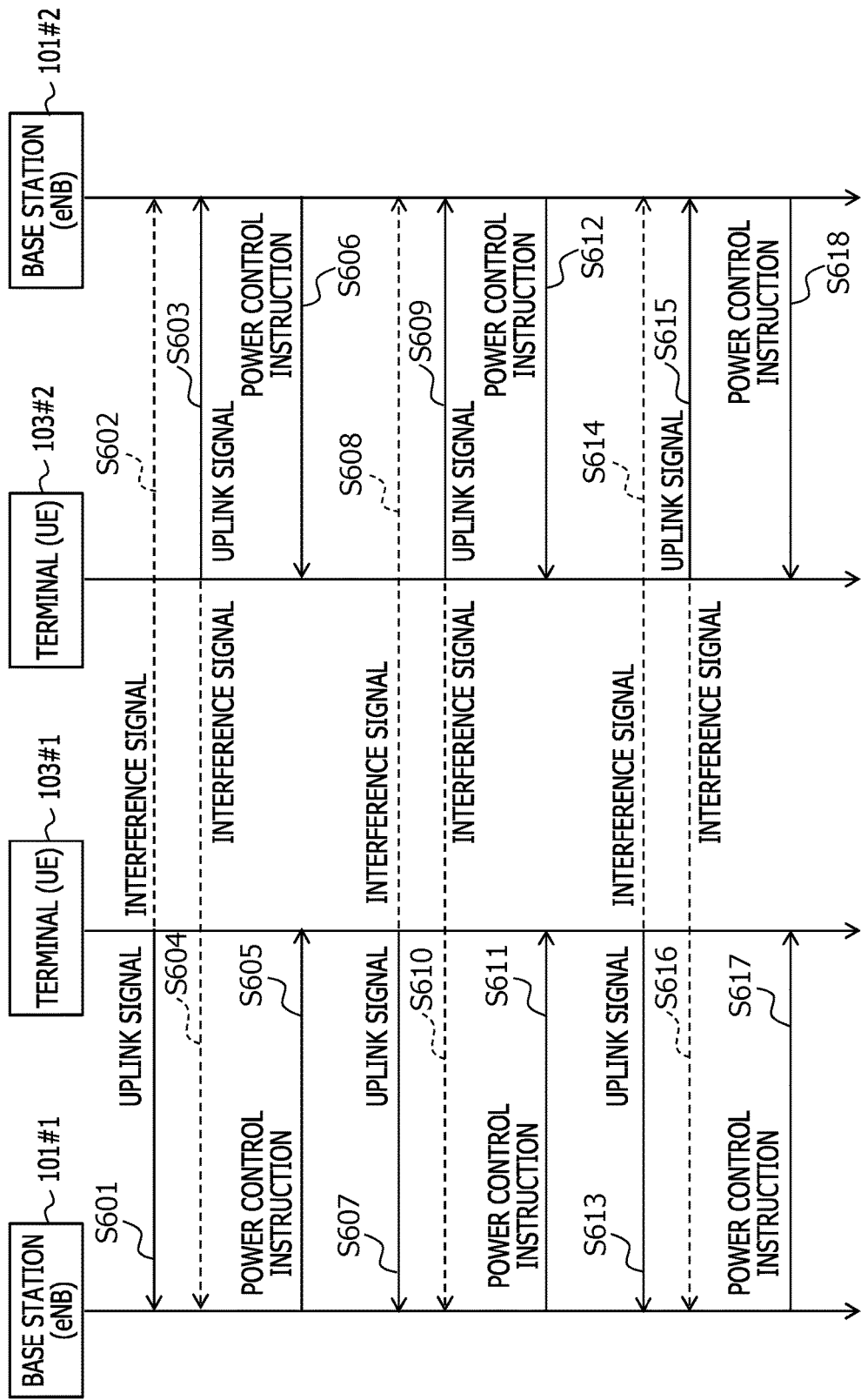
FIG. 6 is a sequence diagram of a communication between the eNB and the UE in the radio communication system.

FIG. 6 is a sequence diagram of a communication among the eNBs 101#1 and 101#2 and the UEs 103#1 and 103#2 in the radio communication system 500 where uplink signals of the UEs 103#1 and 103#2 become uplink interference signals of the eNBs 101#1 and 101#2 respectively.

In step S601, the UE 103#1 transmits an uplink signal to the eNB 101#1. For example, assume that the UE 103#1 transmits data to the eNB 101#1 by using PUSCH. Also, assume that at the same time as in step S601 or at a proximate time thereto, in step S603, the UE 103#2 transmits an uplink signal to the eNB 101#2. At that time, as indicated by a dotted arrow of step S602, the uplink signal transmitted by the UE 103#1 in step S601 is received in step S603 as an uplink interference signal that interferes with an uplink signal transmitted by the UE 103#2 to the eNB 101#2. As indicated by a dotted arrow of step S604, the uplink signal transmitted by the UE 103#2 in step S603 is received in step S601 as an uplink interference signal that interferes with an uplink signal transmitted by the UE 103#1 to the eNB 101#1.

Thus, the reception quality of the uplink signal that the eNB 101#1 receives from the UE 103#1 in step S601 is inferior to the target reception quality. The eNB 101#1 implements processings illustrated in the flowchart of FIG. 2, and transmits the power control instruction to increase the transmission power of the UE 103#1 (step S605). In the same manner, the reception quality of the uplink signal that the eNB 101#2 receives from the UE 103#2 in step S603 is inferior to the target reception quality. The eNB 101#2 implements processings illustrated in the flowchart of FIG. 2, and transmits the power control instruction to increase the transmission power of the UE 103#2 (step S606).

Assume that upon receiving respective power control instructions, UEs 103#1 and 103#2 increase the transmission power offset value, and transmit an uplink signal at the same time or at a proximate time in steps S607 and S609. Then, in steps S608 and S610, each of uplink signals are also received by eNBs 101#1 and 101#2 as an uplink interference signal, and reception intensity of each of the uplink interference signals becomes larger than in steps S602 and S604. In other words, as the UE 103#1 transmits the uplink signal by increasing the transmission power, an uplink interference signal interfering with an uplink signal received from the UE 103#2 by the eNB 101#2 becomes stronger, and thereby inhibits improvement of the reception quality. Also, as the UE 103#2 transmits an uplink signal by increasing the transmission power, an uplink interference signal interfering with an uplink signal received from the UE 103#1 by the eNB 101#1 also becomes stronger, and thereby inhibits improvement of the reception quality.

Thus, the reception quality acquired by eNBs 101#1 and 101#2 becomes inferior to the target reception quality again. Then, in each of steps S611 and S612, eNBs 101#1 and 101#2 again transmit the power control instruction to increase the transmission power.

Assume that upon receiving respective power control instructions, UEs 103#1 and 103#2 increase the transmission power offset value again, and transmit an uplink signal at the same time or at a proximate time in steps S613 and S615. Then, in each of steps S614 and S616, each of uplink signals is also received by eNBs 101#1 and 101#2 as an uplink interference signal, and reception intensity of each of the uplink interference signals becomes further larger than in steps S602 and S604.

When the reception quality acquired by each of eNBs 101#1 and 101#2 is inferior to the target reception quality, in each of steps S617 and S618, eNBs 101#1 and 101#2 transmit the power control instruction to increase an uplink transmission power.

As above, in a case where a plurality of eNBs 101#1 and #101#2 are disposed within one area, the eNBs mutually affect each other via UEs 103#1 and 103#2, and thereby the transmission power of the UEs 103#1 and 103#2 may increase. Increase of the transmission power continues until transmission powers of UEs 103#1 and 103#2 become the maximum. However, even when the transmission powers become the maximum, the reception quality of eNBs 101#1 and 101#2 is inferior to the target reception quality.

As described above, an interaction between a plurality of eNBs 101 and a plurality of UEs 103 may cause the transmission power of the UE 103 to become the maximum, and thereby a deteriorated state of the reception quality may be maintained.

Figure 7:
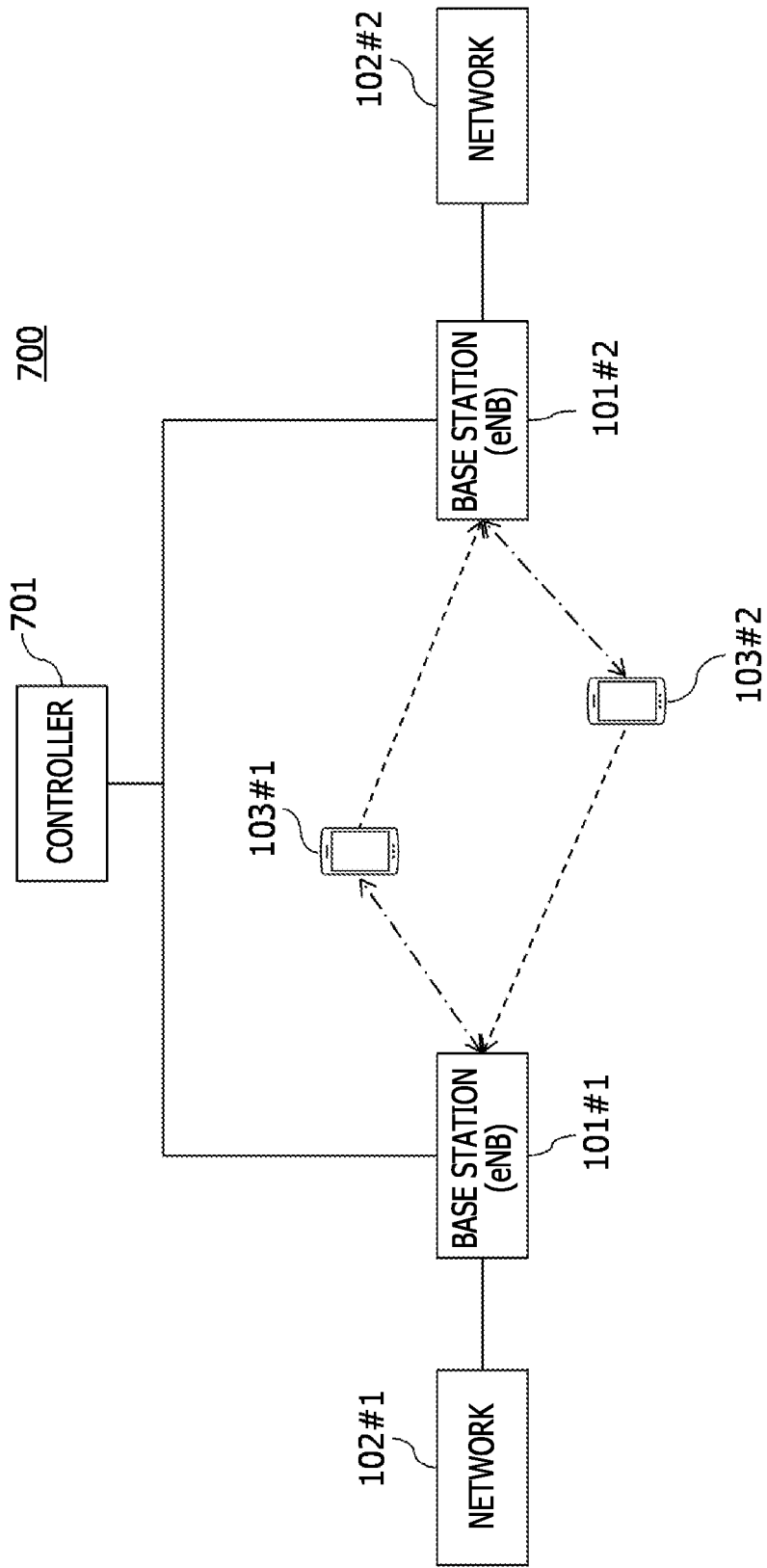
FIG. 7 is an overall configuration view of a radio communication system according to a first embodiment.

FIG. 7 is an overall configuration view of a radio communication system 700 configured to suppress deterioration of the reception quality. In the radio communication system 700, each of eNBs 101#1 and 101#2 is coupled to networks 102#1 and 102#2 respectively. Networks 102#1 and 102#2 may be different networks or the same network. As indicated by a single dot chain line between the UE 103#1 and the eNB 101#1, the UE 103#1 communicates with the eNB 101#1. As indicated by a single dot chain line between the UE 103#2 and the eNB 101#2, the UE 103#2 communicates with the eNB 101#2. In other words, the UE 103#1 is under control of the eNB 101#1, and the UE 103#2 is under control of the eNB 101#2.

As indicated by a dotted line between the UE 103#1 and the eNB 101#2, an uplink signal transmitted by the UE 103#1 may become an uplink interference signal that interferes with an uplink signal that the eNB 101#2 receives from the UE 103#2. As indicated by a dotted line between the UE 103#2 and the eNB 101#1, an uplink signal transmitted by the UE 103#2 may become an uplink interference signal that interferes with an uplink signal that the eNB 101#1 receives from the UE 103#1.

The radio communication system 700 is a modified version of the radio communication system 500 configured such that each of eNBs 101#1 and 101#2 is communicable with a controller 701. Each of eNBs 101#1 and 101#2 and controller 701 may communicate with each other as illustrated in FIG. 7.

When communication is made with the controller 701 coupled with eNBs 101#1 and 101#2, the controller 701 may be disposed in a vicinity of a location where eNBs 101#1 and 101#2 are disposed. For example, the controller 701 is disposed on an office floor where eNBs 101#1 and 101#2 are disposed. The controller 701 may be separate from both of eNBs 101#1 and 101#2. The controller 701 may be integrally configured with the eNB 101#1 or 101#2, and the eNB 101#1 or eNB 101#2 may have a function of the controller 701.

Each of eNBs 101#1 and 101#2 may have a function of the controller 701. In this case, for example, the function of the controller 701 performed by any of eNBs 101#1 and 101#2 may be determined based on the number of UEs 103 under control.

Alternatively, each of eNBs 101#1 and 101#2 and the controller 701 may be coupled with each other via networks 102#1 and 102#2. Also, each of eNBs 101#1 and 101#2 and the controller 701 may be coupled with each other via a different network. When coupled via a network, the controller 701 may be disposed in a site remote from a location where eNBs 101#1 and 101#2 are disposed.

Either one of eNBs 101#1 and 101#2 may be coupled with the controller 701 without intervention of the network 102#1 or 102#2. Then, the other one of eNBs 101#1 and 101#2 may be coupled with the controller 701 via the network 102#1 or 102#2. In a case where networks 102#1 and 102#2 are core networks, the controller 701 may constitute a part of a core network controller that controls the core network.

Coupling between each of eNBs 101#1 and 101#2 and the controller 701 may be made by wiring or by wiring including a portion of wireless coupling.

Figure 8:
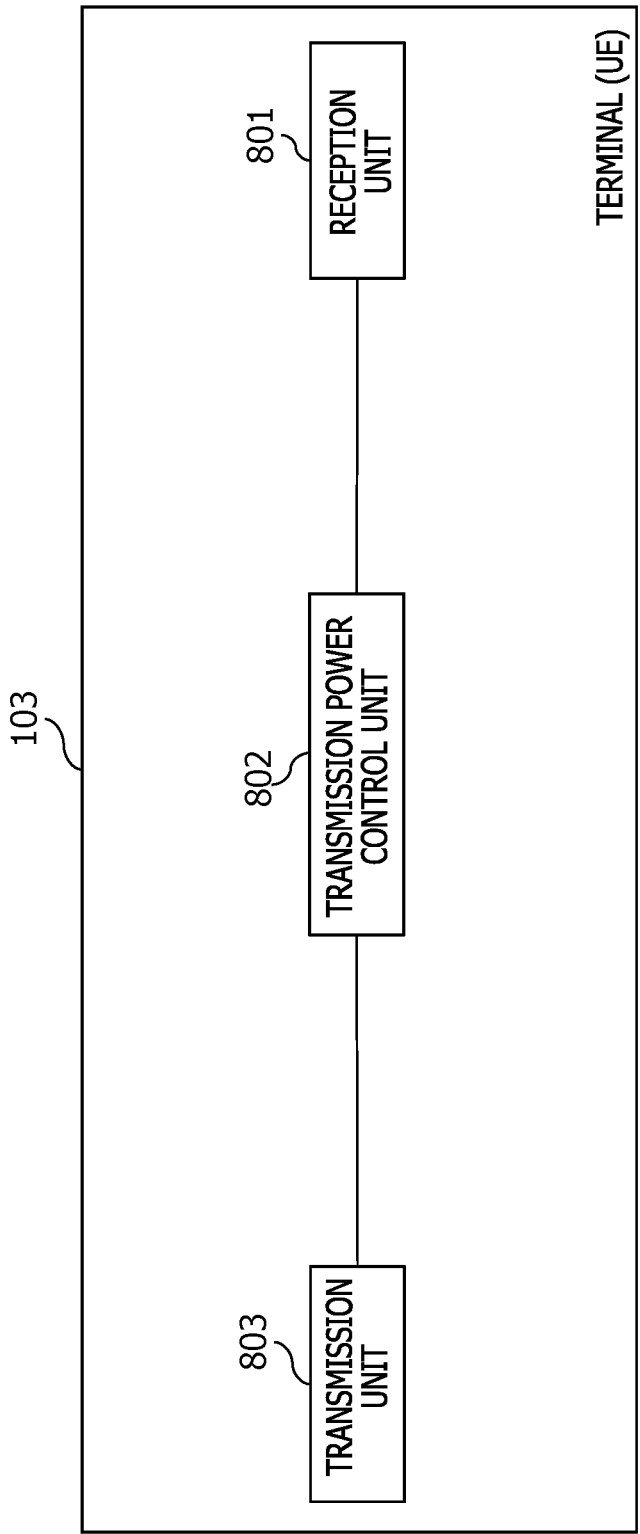
FIG. 8 is a functional block diagram of the UE in the first embodiment.

FIG. 8 is a functional block diagram of the UE 103. The UE 103 includes a reception unit 801, a transmission power control unit 802, and a transmission unit 803. The reception unit 801 is configured to receive a control signal including the power control instruction and requested user data (for example, downlink communication data) from the eNB 101. The transmission power control unit 802 is configured to control an uplink transmission power for the transmission unit 803 transmitting an uplink signal, in response to the power control instruction received by the reception unit 801. The transmission unit 803 is configured to transmit an uplink signal (for example, a signal representing uplink communication data and an uplink control signal) in accordance with control of the uplink transmission power by the uplink transmission power control unit 802.

The transmission unit 803 may be configured to transmit information related to present transmission power of the transmission unit 803 to the eNB 101 by including in the uplink signal. The transmission unit 803 may be configured to transmit location information of the UE 103 to the eNB 101 by including in the uplink signal. Information related to the transmission power may include flag information indicating whether present transmission power is the maximum transmission power that the transmission unit 803 may transmit, as well as the magnitude of the transmission power. Location information may be location information directly representing the location with a land surface measured by GPS and so on as a reference, or information indirectly indicating the location relative to a neighboring eNB 101 from a RSRP value measured based on a signal received from the neighboring eNB 101. GPS is an abbreviation for Global Positioning System, and RSRP is an abbreviation for Reference Signal Received Power.

The UE 103 may further include a component for exhibiting other functions of the UE 103, in addition to components illustrated in FIG. 8. For example, in a case where the UE 103 is a mobile phone, the UE 103 may further include a component for exhibiting a call control function and controlling call function.

Description of the processing of transmission power control of the UE 103 in the transmission power control unit 802 is omitted as being illustrated in the flowchart of FIG. 3.

Figure 9:
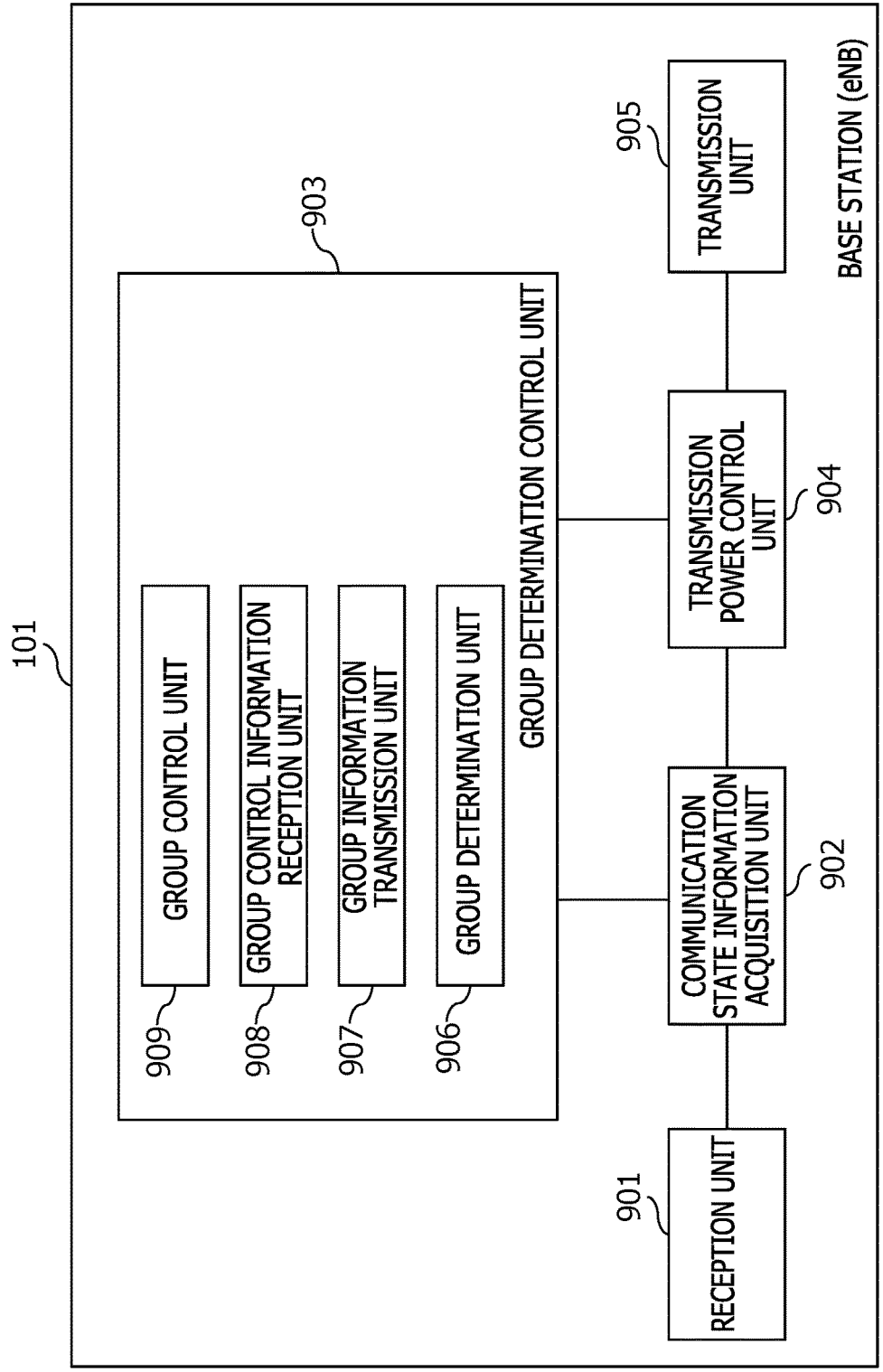
FIG. 9 is a functional block diagram of the eNB in the first embodiment.

FIG. 9 is a functional block diagram of the eNB 101. The eNB 101 includes a reception unit 901, a communication state information acquisition unit 902, a group determination control unit 903, a transmission power control unit 904, and a transmission unit 905. The group determination control unit 903 includes a group determination unit 906, a group information transmission unit 907, a group control information reception unit 908, and a group control unit 909.

The reception unit 901 is configured to receive an uplink signal transmitted by the UE 103. The reception unit 901 is configured to perform down conversion and decoding of the uplink signal from the UE 103 and acquire measurement data requested for the communication state information acquisition unit 902 to acquire communication state information described next.

The communication state information acquisition unit 902 acquires information (communication state information) representing a state of communication between the eNB 101 and UE 103 based on an uplink signal that the reception unit 901 receives from the UE 103. The communication state information includes the reception quality. As described above, the reception quality may be represented, for example, by the SIR value. The SIR value may be determined by subtracting a measured value of the reception signal power received by the reception unit 901 from a value of the signal power of the uplink signal measured by the reception unit 901, for example, by using a known data series included in the uplink signal.

The communication state information acquisition unit 902 may acquire a transmission power value included in the uplink signal or transmitted from the UE 103 along with the uplink signal, if any, as information constituting the communication state information. The communication state information acquisition unit 902 may also acquire location information included in the uplink signal or transmitted from the UE 103 along with the uplink signal, if any, as information constituting the communication state information.

In other words, the communication state information acquisition unit 902 is an example of the detection unit, and by way of example, detects quality index of the uplink communication of the UE 103 from an uplink signal transmitted by the UE 103 located at any of a plurality of radio areas. Quality index of the uplink communication may be represented by the reception quality or reception power of the uplink signal. More specifically, as the quality index becomes better, the communication quality also becomes better. The reception quality may be, by way of example, SIR, RSRP, and so on.

The communication state information acquisition unit 902 transfers the acquired communication state information to the group determination control unit 903 and the transmission power control unit 904. When transferring the communication state information, the communication state information acquisition unit 902 also transfers identification information of the UE 103 indicating the UE 103 to which the communication state information is related.

The transmission power control unit 904 controls the transmission power of individual UEs 103 based on the communication state information transferred from the communication state information acquisition unit 902. Specifically, the transmission power control unit 904 controls the transmission power of individual UEs 103 based on the flowchart illustrated in FIG. 2. When notified by the group determination control unit 903 that group control is performed based on group determination of UEs 103, the transmission power control unit 904 implements group control by changing control basis of the transmission power from individual UEs to the group to which the UE 103 belongs. Examples of the group to which the UE 103 belongs and the group control are described later.

In other words, the transmission power control unit 904 is an example of the control unit, and by way of example, controls the transmission power of the UE 103 in accordance with control information received from the controller 701.

The group determination control unit 903 determines the group to which respective UEs 103 belong, based on the communication state information transferred from the communication state information acquisition unit 902. Based on the result of group determination and instruction from the controller 701, the group determination control unit 903 may cause the transmission power control unit 904 to proceed to group control by notifying to implement group control of UEs 103.

For example, the eNB 101 may manage a table illustrated in FIG. 10 such that the group determination control unit 903 determines the group to which the UE 103 belongs, and the transmission power control unit 904 implements transmission power control and group control of individual UEs. As illustrated in FIG. 10, the table has columns of "terminal ID", "target reception quality", "reception quality", "transmission power", and "group". "Terminal ID" is a name of the column where identification information of the UE 103 is stored. "Target reception quality" is a name of the column where information of the target reception quality (for example, SIR value corresponding to the target reception quality) of the UE 103 is stored. "Reception quality" is a name of the column where information of the reception quality (for example, SIR value) of the uplink signal from the UE 103 is stored. "Transmission power" is a name of the column where the transmission power of the UE 103 is stored. The TPC offset value may be stored in the column of "transmission power" instead of the transmission power itself. "Group" is a name of the column where identification information of the group to which the UE 103 belongs is stored.

A first row of the table illustrated in FIG. 10 stores identification information of the UE 103, information of the target reception quality, information of the reception quality, the transmission power value, and identification information of the group by associating the identification information of the UE 103 with the information of the target reception quality, information of the reception quality, and transmission power value. Also, the identification information of the UE 103 is associated with the identification information of the group. In a case where location information of the UE 103 is transmitted to the eNB 101 by including in the uplink signal, a column for storing location information and so on may be added to the table illustrated in FIG. 10 and be associated with the identification information of the UE 103.

When the communication state information is transferred from the communication state information acquisition unit 902 to the group determination control unit 903, values stored in columns of "reception quality" and "transmission power" by associating with the identification information of the UE 103 are changed. In a case where the identification information of the UE 103 is not stored in the column of "terminal "ID"", a new row is inserted into the table illustrated in FIG. 10, and the target reception quality, reception quality and transmission power are stored therein.

The group determination unit 906 determines the group to which the UE 103 belongs, based on information stored in the table of FIG. 10. In the present embodiment, the group determination unit 906 may determine to which group the UE 103 belongs among three groups, based on the relationship among the transmission power, target reception quality, and reception quality of the UE 103.

In other words, the group determination unit 906 is an example of the determination unit, and by way of example, determines to which group the UE 103 belongs among a plurality of groups set for the quality index, based on a detected quality index.

FIG. 11 is a table illustrating an example of the reference for classifying the UE 103 to the three groups. First, group C (or may be referred to as a "third group") is a group of UEs 103 of the transmission power smaller than a threshold value (predetermined value). The transmission power of UEs 103 belonging to the group C is relatively small. Thus, it is considered that an uplink signal from a UE 103 belonging to the group C does not become an uplink interference signal in another eNB 101 or that even if the uplink signal becomes the uplink interference signal, the uplink signal does not impair the reception quality of an uplink signal from another UE 103.

Group B (or may be referred to as a "second group") and group A (or may be referred to as a "first group") are groups of UEs 103 of the transmission power larger than or equal to the threshold value. It is considered that an uplink signal from UEs 103 belonging to the group B or group A may become an uplink interference signal in another eNB 101 as the transmission power thereof is relatively large.

The group B is a group of UEs 103 of the reception quality not inferior to the target reception quality, among UEs 103 of the uplink transmission power larger than or equal to the threshold value. For the UEs 103 belonging to the group B, it is considered that the transmission power does not become larger than the present value as the target reception quality is not inferior to the reception quality. Thus, it is considered that the state of the transmission power continues when the uplink signal of the UE 103 belonging to the group B does not become an uplink interference signal in the other eNB 101. Also, it is considered that the state of the transmission power continues even when the uplink signal of the UE 103 belonging to the group B becomes an uplink interference signal in the other eNB 101.

The group A is a group of UEs 103 of the reception quality inferior to the target reception quality among UEs 103 of the uplink transmission power larger than or equal to the threshold value. For UEs 103 belonging to the group A, it is expected that the transmission power becomes larger from now on as the target reception quality is inferior to the reception quality. Thus, it is considered that even if the uplink signal of the UE 103 belonging to the group A does not become an uplink interference signal in the other eNB 101 presently, there is a high possibility that the uplink signal becomes an uplink interference signal in the other eNB 101 from now on.

As above, the transmission power of the UE 103 belonging to the group A is expected to become further larger from now on. Thus, when performing the group control, the transmission power may be controlled by setting the priority thereof higher than other groups. For UEs 103 belonging to the group B, as the transmission power is large, the transmission power may be controlled in the priority order next to the group A.

The above priority is, for example, as follows: When performing the group control, if there exists a UE 103 belonging to the group A under control of the eNB 101, transmission power control of the UE 103 is performed. If there exists no UE 103 belonging to the group A under control of the eNB 101 and there exists a UE 103 belonging to the group B, transmission power control of the UE 103 belonging to the group B is performed.

FIG. 12 is a flowchart of a processing of performing the group determination of the UE 103 by the group determination unit 906. In step S1101, the group determination unit 906 receives transfer of communication state information acquired by the communication state information acquisition unit 902 and acquires communication state information from the UE 103. In other words, the group determination unit 906 may acquire the transmission power of the UE 103, SIR of the uplink signal, and the downlink RSRP from adjacent cells based on the uplink signal transmitted by the UE 103. Upon acquiring the communication state information, the group determination unit 906 may store the acquired communication state information into the table illustrated in FIG. 10.

In step S1102, the group determination unit 906 determines whether the transmission power value is larger than or equal to the threshold value. If the transmission power value is smaller than the threshold value (step S1102: NO), the group determination unit 906 proceeds the processing to step S1103 and determines that the UE 103 belongs to the group C. Result of the determination is stored into the column of "group" of the table illustrated in FIG. 10.

If the transmission power value is larger than or equal to the threshold value (step S1102: YES), the group determination unit 906 proceeds the processing to step S1104 and determines whether the reception quality is inferior to the target reception quality. If the reception quality is not inferior to the target reception quality (step S1104: NO), the group determination unit 906 proceeds the processing to step S1105 and determines that the UE 103 belongs to the group B. Result of the determination is stored into the column of "group" of the table illustrated in FIG. 10.

If the reception quality is inferior to the target reception quality (step S1104: YES), the group determination unit 906 proceeds the processing to step S1106 and determines that the UE 103 belongs to the group A. Result of the determination is stored into the column of "group" of the table illustrated in FIG. 10.

The group information transmission unit 907 transmits result of the determination by the group determination unit 906 to the controller 701. For example, the group information transmission unit 907 counts the number of UEs 103 belonging to the group A, group B, and group C respectively by referring to the table illustrated in FIG. 10, and transmits the result thereof to the controller 701. Alternatively, the group information transmission unit 907 may transmit the ratio of UEs 103 belonging to the group A, group B, and group C respectively to the controller 701.

In other words, the group information transmission unit 907 is an example of the (first) transmission unit, and by way of example, transmits the group determination result of the UE 103 to the controller 701.

The group control information reception unit 908 receives information indicating necessity or non-necessity of the group control and, if the group control is requested, receives content of the group control from the controller 701. The group control may include, for example, a control that maintains the transmission power of the UE 103 belonging to the group A in the present state and does not increase to a value larger than the present value. As an example of another control, the group control may include a control that decreases the transmission power value of the UE 103 belonging to group A to a value smaller than the present value, for example, a value having a predetermined relationship with the threshold value. For example, the transmission power may be decreased down to the threshold value, or the transmission power may be controlled to a value between the present transmission power and threshold value. In addition to the content of the group control of the group A, the transmission power value of the UE 103 belonging to group B may be maintained in the present state or may be decreased down to a value having a predetermined relationship with the threshold value. For example, the transmission power may be controlled to a minimum value of the transmission power of the UE 103 belonging to the group A. When performing the group control, content of the control may include information representing a time length of the group control or a condition for canceling the group control.

In other words, the group control information reception unit 903 is an example of the (first) reception unit, and by way of example, receives, from the controller 701, control information indicating a method of controlling the transmission power of an uplink signal determined by the controller 701 for each of groups based on the determination result received from a plurality of radio areas.

The group control unit 909 controls the transmission power control unit 904 based on the content of control received by the group control information reception unit 908. For example, in a case where the content received by the group control information reception unit 908 indicates non-implementation of the group control, the group control unit 909 causes the transmission power control unit 904 to perform control of the transmission power of individual UEs 103. In a case where the group control is requested, the group control unit 909 transmits the content to the transmission power control unit 904 and causes the transmission power control unit 904 to implement the group control. In a case where information representing a time length of the group control is included in the content of control, the group control unit 909 activates a timer and cancels the group control after a specified time length has elapsed.

Figure 13A:
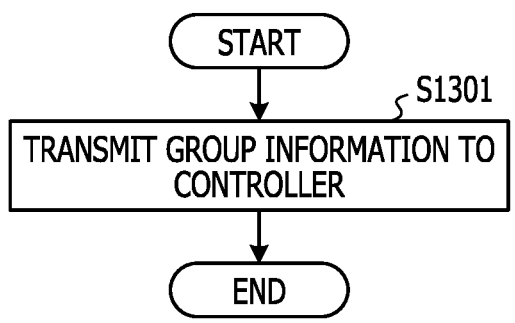
FIGS. 13A and 13B are flowcharts of a processing of the group determination control unit in the first embodiment.
Figure 13B:
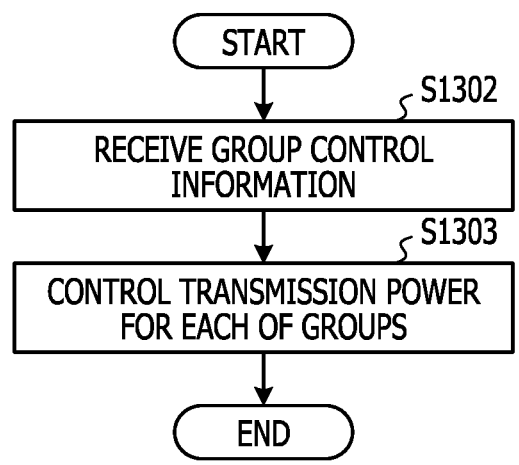

FIGS. 13A and 13B are flowcharts of processings of the group determination control unit 903. Referring to FIG. 13A, in step S1301, the group information transmission unit 907 transmits group information to the controller 701. The processing of the flowchart of FIG. 13A is implemented after the flowchart of FIG. 12 has been implemented or every time a predetermined time has elapsed. Alternatively, the processing of the flowchart of FIG. 13A may be implemented when group information is requested by the controller 701.

FIG. 13B is a flowchart of a processing in which the group control unit 909 receives group control information from the controller 701 and causes the transmission power control unit 904 to implement the group control. In step S1302, the group control information reception unit 908 receives the group control information. In step S1303, the group control unit 909 analyzes the group control information, and if the group control is requested, transmits the content of the group control to the transmission power control unit 904 and implements the group control.

Figure 14:
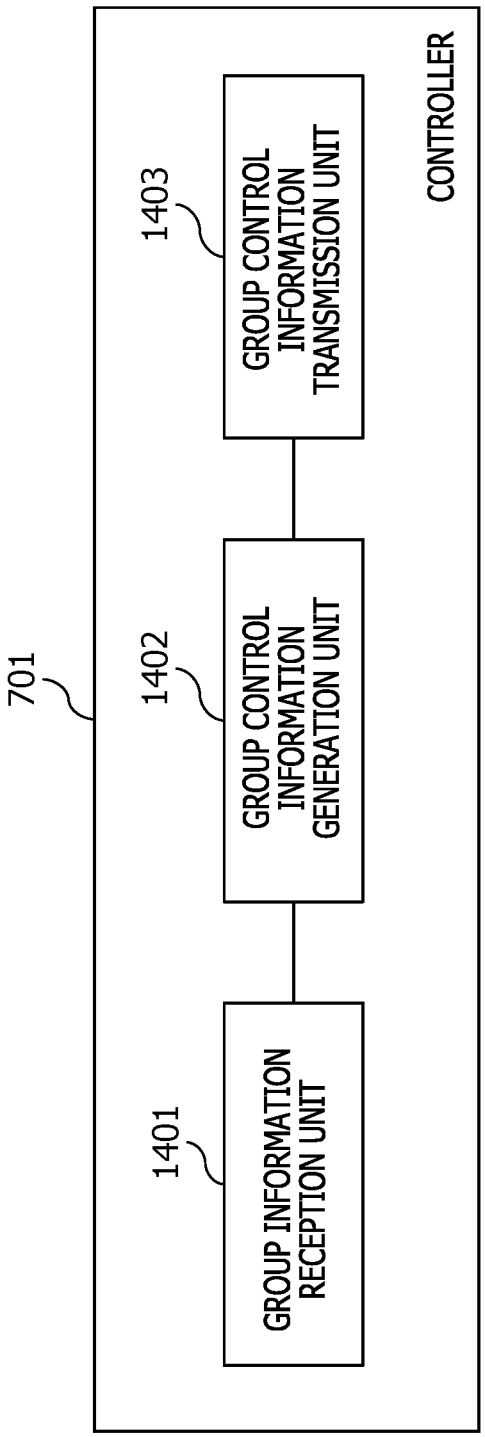
FIG. 14 is a functional block diagram of the controller in the first embodiment.

FIG. 14 is a functional block diagram of the controller 701. The controller 701 includes a group information reception unit 1401, a group control information generation unit 1402, and a group control information transmission unit 1403.

The group information reception unit 1401 is configured to receive the group information from respective eNBs 101. Upon receiving the group information from the eNB 101, the group information reception unit 1401 causes a storage device to store, for example, the number of UEs 103 belonging to respective groups for each of eNBs 101 into the memory 3121 (described later with reference to FIG. 31C).

In other words, the group information reception unit 1401 is an example of the second reception unit, and by way of example, receives the group determination result of the UE 103 from a plurality of eNBs 101 respectively.

FIG. 15 is a diagram in a table format illustrating an example of information indicating the number of UEs 103 belonging to respective groups for each of eNBs 101. "Base station ID" is a name of the column where identification information of the eNB 101 is stored. "Group A terminal number" is a name of the column where the number of UEs belonging to the group A is stored. "Group B terminal number" is a name of the column where the number of UEs belonging to the group B is stored. "Group C terminal number" is a name of the column where the number of UEs belonging to the group C is stored. A first row of the table illustrated in FIG. 15 stores identification information of the eNB 101, the number of UEs belonging to the group A, the number of UEs belonging to the group B, and the number of UEs belonging to the group C by associating identification information of the eNB 101 with the number of UEs belonging to groups A, B and C.

The controller 701 may store location information represented by longitude and latitude of the eNB 101 by associating with identification information of the eNB 101. The group control information generation unit 1402 may be configured to calculate location relation of the eNB 101 by using such location information of the eNB 101. The location information may not be information using ground surface such as longitude and latitude as a reference, and may be constituted by, for example, identification information of the building or floor identification information of the building. In a case where identification information of the building of a plurality of eNBs 101 and floor identification information of the building match each other, the group control information generation unit 1402 calculates that the plurality of eNBs 101 are disposed adjacent to each other.

The group control information generation unit 1402 generates the group control information based on the group information received by the group information reception unit 1401.

In other words, the group control information generation unit 1402 is an example of the generation unit, and by way of example, generates control information based on the group determination result of the UE 103 received from the eNB 101.

For example, assume that total number of UEs 103 belonging to the group B in a plurality of eNBs 101#1 to 101#8 disposed adjacent to an eNB 101#9 is larger than a certain number. The transmission power of UEs 103 belonging to the group B is expected not to increase. However, as the transmission power is large, the transmission power may become an interference signal source to an uplink signal of a UE 103 that communicate with the eNB 101#9 having a radio area adjacent to radio areas of eNBs 101#1 to 101#8. Then, the group control information generation unit 1402 generates the group control information indicating that the transmission power of the UE 103 communicating with eNBs 101#1 to 101#8 is decreased, for example, to a value having a predetermined relationship with the threshold value.

For example, assume that the number of UEs 103 belonging to the group A in an eNB 101#12 having a radio area adjacent to a radio area of an eNB 101#11 is larger than a certain number. As above, the transmission power of UEs 103 belonging to the group A is expected to further increase from now on. As there are many such UEs 103, the group control information generation unit 1402 generates group control information configured to maintain the transmission power of the UEs 103 belonging to the group A in the eNB 101#12 in the present state or decrease the transmission power of the UE 103 down to a value having a predetermined relationship with the threshold value.

The group control information generation unit 1402 may determine whether total number of UEs 103 of the reception quality illustrated in FIG. 11 inferior to the target reception quality is larger than or equal to a certain number. Then, in a case where total number of UEs of the reception quality inferior to the target quality is larger than or equal to a certain number, the group control information generation unit 1402 may instruct respective eNBs 101 to start investigation of the UE group. Thus, grouping of UEs and transmission power control are started.

The group control information transmission unit 1403 transmits the group control information generated by the group control information generation unit 1402 to the eNB 101. The group control information transmission unit 1403 may be configured to transmit the group control information to an eNB 101 having a group of UEs 103 subjected to the group control without transmitting to all eNBs 101.

In other words, the group control information transmission unit 1403 is an example of the second transmission unit, and by way of example, transmits the generated control information to each of a plurality of eNBs 101.

The threshold value of the number of UEs 103 subjected to the group control such as the above "total number of UEs 103" may not be a certain number but may change as the time elapses. For example, as the number of UEs 103 in an office floor differs significantly between day and night times, the threshold value of the number of UEs 103 may be selected based on the time zone, for example, such that the threshold value of the number of UEs 103 becomes larger in the day time and smaller in the night time. Alternatively, in reverse, the threshold value of the number of UEs 103 may be small in the day time, and the threshold value of the number of UEs 103 in the night time may be large. The day time (for example, working hours of tenants in an office floor where the controller 701 is installed) may be set as a time zone when the group control may be implemented, and the group control information generation unit 1402 may not operate the group control in the other time zone.

Figure 16:
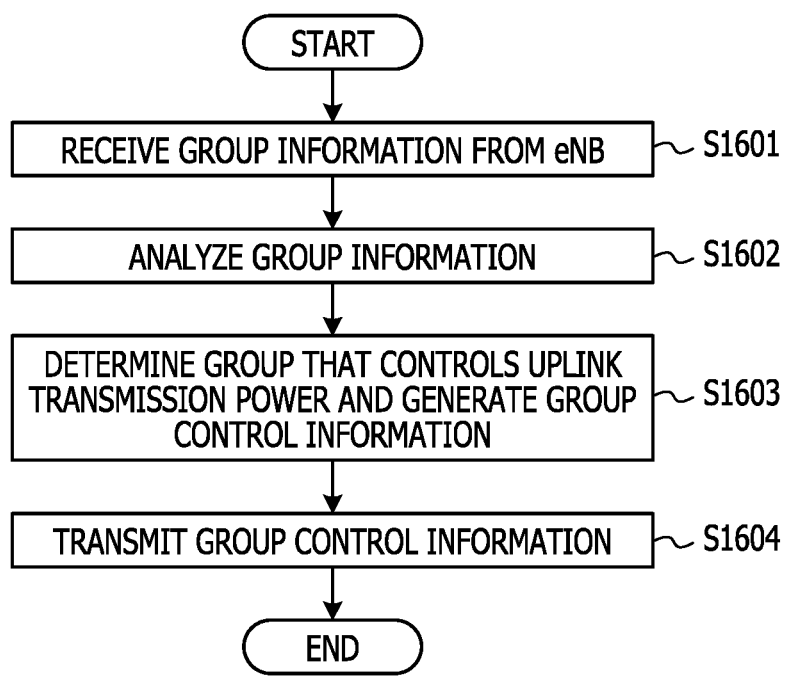
FIG. 16 is a flow chart of a processing of the controller in the first embodiment.

FIG. 16 is a flowchart of the processing of the controller 701. In step S1601, the group information reception unit 1401 receives the group information from the eNB 101. In step S1602, the group control information generation unit 1402 analyzes the group information. In step S1603, the group control information generation unit 1402 determines the group controlling the uplink transmission power based on the analysis result in step S1602, and generates the group control information. In step S1604, the group control information transmission unit 1403 transmits the group control information generated in step S1603 to the eNB 101.

Figure 17:
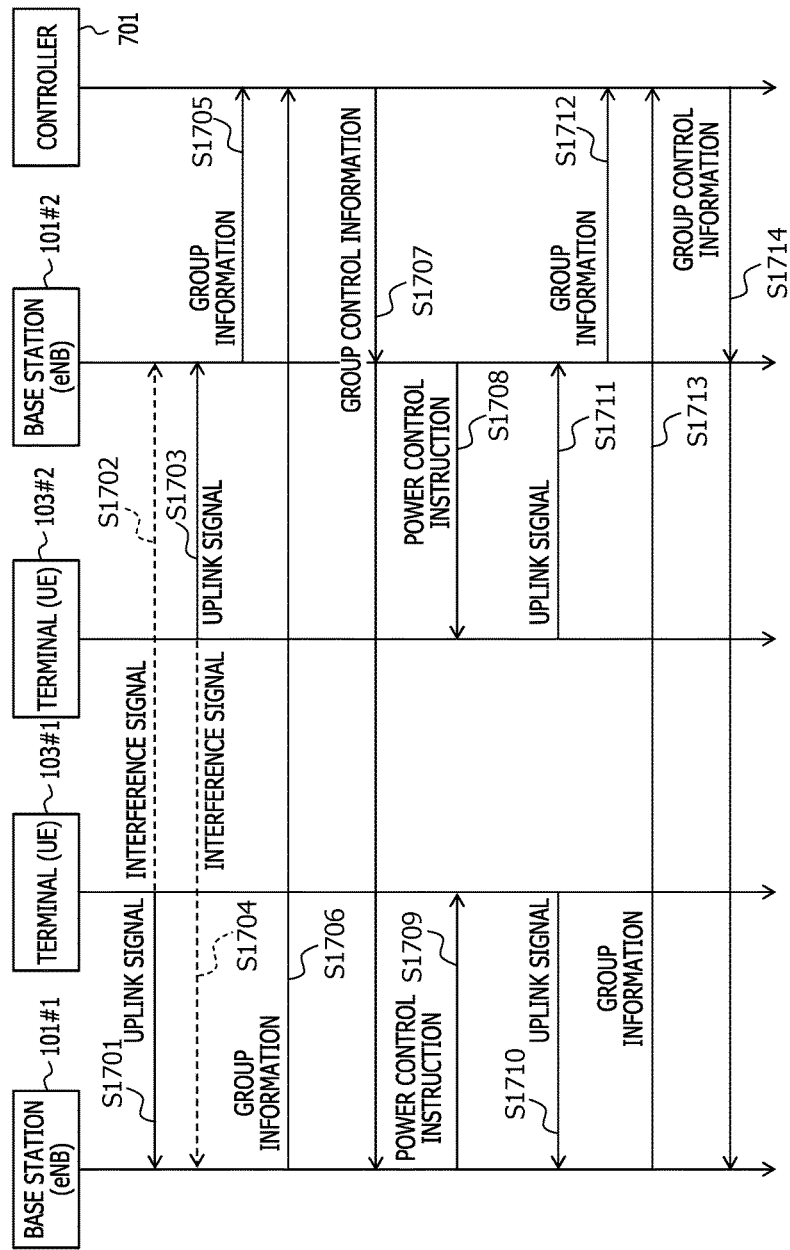
FIG. 17 is a sequence diagram illustrating an example of a communication by the radio communication system in the first embodiment.

FIG. 17 is a sequence diagram illustrating an example of communication among the eNB 101, UE 103, and controller 701 in the radio communication system 700.

In step S1701, the UE 103#1 transmits an uplink signal to the eNB 101#1. At the same time as in step S1701 or within a time proximate thereto, in step S1703, the UE 103#2 transmits an uplink signal to the eNB 101#2. At that time, as indicated in steps S1702 and S1704, the uplink signal transmitted by the UE 103#1 in step S1701 is received by the eNB 101#2 as an uplink interference signal. The uplink signal transmitted by the UE 103#2 in step S1703 is received by the eNB 101#1 as an uplink interference signal.

In step S1705, the eNB 101#2 transmits the group information to the controller 701, and in step S1706, the eNB 101#1 transmits the group information to the controller 701.

The controller 701 analyzes the group information transmitted from the eNB 101#2 and eNB 101#1. For example, if there are many UEs 103 belonging to the group A among UEs communicating with eNBs 101#2 and 101#1 respectively, it is determined that an uplink transmission signal transmitted by each of the UEs 103 may become an uplink interference signal in the eNB 101#1 and eNB 101#2. Based on the determination, the controller 701 generates the group control information controlling the uplink transmission power, and in step S1707, transmits the generated group control information to the eNB 101#2 and eNB 101#1.

Upon receiving the group control information, each of the eNB 101#2 and eNB 101#1 starts group control and generates the power control instruction that limits the uplink transmission power of the UE 103#2 and UE 103#1. In steps S1708 and S1709, each of the eNB 101#2 and eNB 101#1 transmits the generated power control instruction to the UE 103#2 and UE 103#1.

Thus, when the UE 103#1 and UE 103#2 transmit the uplink signal in each of steps S1710 and S1711, the UE 103#1 and UE 103#2 limit the transmission power. This limitation reduces occurrence of the uplink interference signal in each of eNBs 101#2 and 101#1, or suppresses to a minor interference even if occurred.

As a result, when the eNB 101#2 and eNB 101#1 transmit the group information and the controller 701 receives the same in next steps S1712 and S1713, it is expected that the number of UEs 103 belonging to the group B or group A may decrease. In step S1714, if group control is not requested, the group control information to that effect is transmitted to the eNB 101#1 and eNB 101#2.

Even if the eNB 101#2 and eNB 101#1 transmit the group information and the controller 701 receives the same in steps S1712 and S1713, further limitation is imposed if the number of UEs 103 belonging to the group A or group B does not decrease. For example, although the group control information transmitted in step S1707 limits the transmission power of UEs 103 belonging to the group A with the priority, the scope of groups to which limitation of the transmission power applies is extended such that limitation of the transmission power is also implemented on UEs 103 belonging to the group B. Alternatively, the group control information transmitted in step S1714 notifies that upper limit of the transmission power is further reduced below limitation of the transmission power imposed by the group control information transmitted in step S1707.

As above, in the present embodiment, UEs 103 communicating with the eNB 101 are grouped, and the controller 701 determines whether the group control and content thereof is requested. Thus, increase of uplink interference due to increase of the uplink transmission power of the UE 103 communicating with each of eNBs 101 may be suppressed. In other words, even if uplink communication performance is deteriorated due to interference by a plurality of eNBs 101, uplink communication performance may be restored and thereby throughput may be improved.

In particular, in a communication area where the uplink interference signal is large, communication state such as deterioration of the SIR value of the uplink signal is prone to increase the transmission power of the UE 103 according to a conventional method of controlling the TPC by closed loop control, and in many cases, this may result in further increasing the uplink interference signal. On the other hand, in the first embodiment, it is possible to mutually reduce the transmission power of UEs 103 belonging to a plurality of communication areas that become an uplink interference signal source to neighboring communication areas. If the uplink interference signal is reduced, increase of useless transmission power in each UE 103 is not requested. Thus, reduction of the transmission power of the UE 103 may be achieved.

(Modified Example of First Embodiment)

FIG. 18 illustrates an example of the determination reference of the group to which the UE 103 belongs.

In the table illustrated in FIG. 11, whether or not the transmission power value is larger than or equal to the threshold value is one of the group determination references, while, in a table illustrated in FIG. 18, the RSRP related to the eNB 101 in an adjacent radio area is one of the group determination references. This is because when RSRP related to an eNB 101 in an adjacent radio area is larger than the threshold value, the UE 103 is close to a location within a predetermined distance from an adjacent radio area and thereby there is a high possibility that the UE 103 becomes an interference signal source of the eNB 101 in the adjacent radio area. Therefore, RSRP of the eNB 101 in the adjacent area may be used instead of the transmission power value. Alternatively, the transmission power value and RSRP of the eNB 101 in the adjacent area may be used in combination. When the transmission power value is large and RSRP of an eNB 101 in an adjacent radio area is large, there is a high possibility that the UE 103 becomes an interference signal source of the eNB 101 in the adjacent radio area. Thus, it is useful to use RSRP as a reference.

The group control information generation unit 1402 of the controller 701 may determine whether the number of eNBs 101 of RSRP larger than or equal to the threshold value is larger than or equal to a certain number. Then, when the number of eNBs 101 of the RSRP larger than or equal to the threshold value is larger than or equal to a certain number, the group control information generation unit 1402 may instruct the eNB 101 to start investigation of the UE group. Thus, grouping of UEs and uplink transmission power control in the first embodiment described above are started.

Second Embodiment

In the example of the first embodiment, the number of groups to which UEs 103 belong is three, and UEs belonging to the group A out of those groups have a transmission power value larger than or equal to the threshold value, and the reception quality inferior to the target reception quality. Thus, it is expected that the transmission power becomes larger from now on. As the second embodiment, further division of the group A to two subgroups is described.

Figure 19:
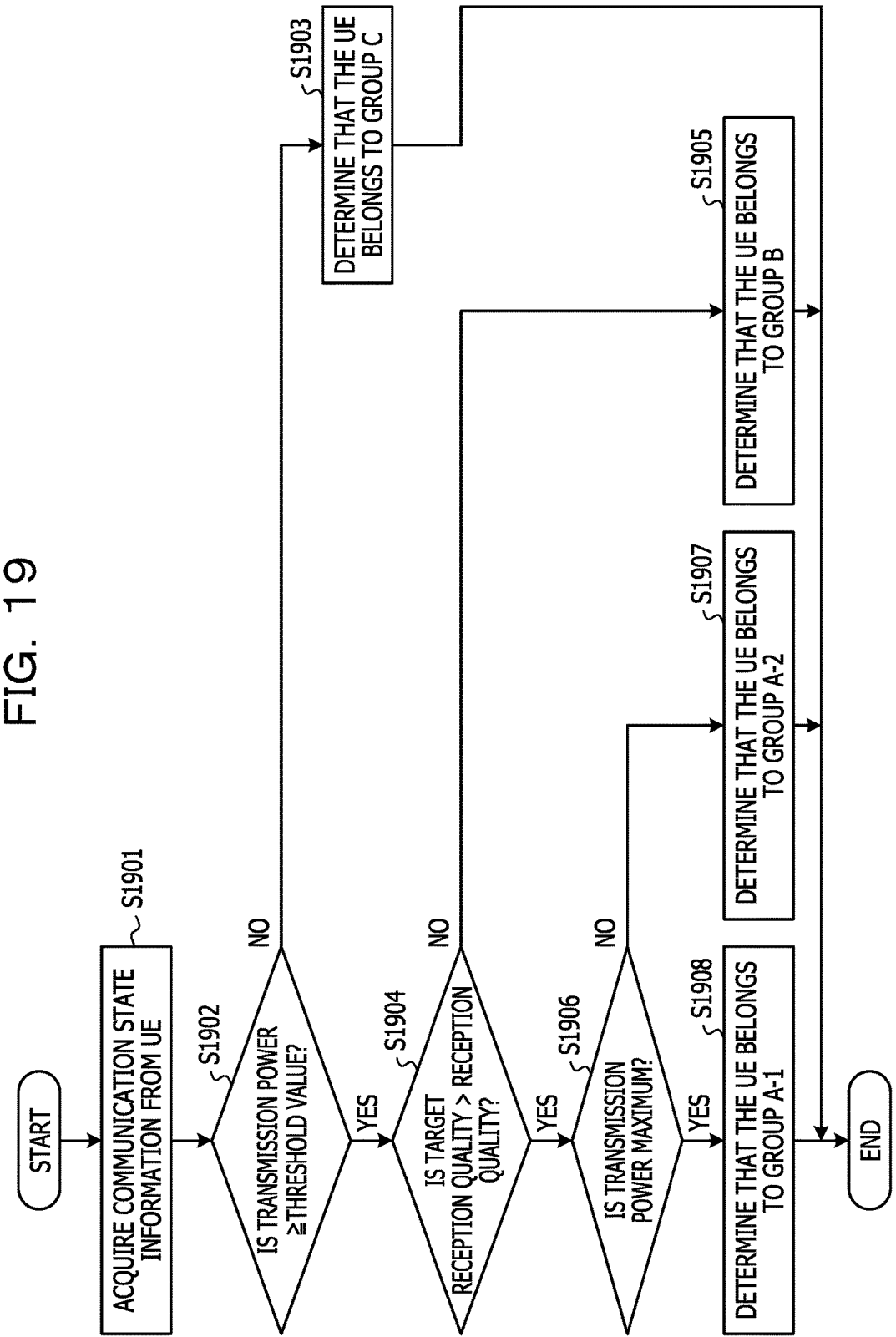
FIG. 19 is a flowchart of a processing of performing a group determination of the UE by the group determination unit in the second embodiment.

FIG. 19 is a flowchart of a processing of performing group determination of the UE 103 by the group determination unit 906 in the second embodiment. In step S1901, the group determination unit 906 receives transfer of the communication state information acquired by the communication state information acquisition unit 902 and acquires the communication state information.

In step S1902, the group determination unit 906 determines whether the transmission power value is larger than or equal to the threshold value. If the transmission power value is not larger than or equal to the threshold value (step S1902: NO), the group determination unit 906 proceeds the processing to step S1903 and determines that the UE 103 belongs to the group C.

If the transmission power value is larger than or equal to the threshold value (step S1902: YES), the group determination unit 906 proceeds the processing to step S1904 and determines whether the reception quality is inferior to the target reception quality. If the reception quality is not inferior to the target reception quality (step S1904: NO), the group determination unit 906 proceeds the processing to step S1905 and determines that the UE 103 belongs to the group B.

If the reception quality is inferior to the target reception quality (step S1904: YES), the group determination unit 906 proceeds the processing to step S1906 and determines whether the transmission power of the UE 103 is the maximum. If the transmission power of the UE 103 is not the maximum (step S1906: NO), the group determination unit 906 proceeds the processing to step S1907 and determines that the UE 103 belongs to the group A-2. The "group A-2" may be referred to as a "second subgroup" of the group A in the first embodiment.

If the transmission power of the UE 103 is the maximum (step S1906: YES), the group determination unit 906 proceeds the processing to step S1908 and determines that the UE 103 belongs to the group A-1. The "group A-1" may be referred to as a "first subgroup" of the group A in the first embodiment.

Therefore, it is further determined in the second embodiment whether the UE 103 belonging to the group A in the first embodiment belongs to the first subgroup or the second subgroup, depending on whether or not the transmission power is the maximum.

For UEs 103 belonging to the first subgroup, the transmission power is the maximum and therefore there is no room to increase the transmission power. However, for UEs 103 belonging to first and second subgroups, the reception quality is inferior to the target reception quality. Therefore, for UEs 103 belonging to first and second subgroups, it may be said that the reception quality does not reach the target reception quality even if the transmission power is increased. In other words, there is a possibility that the reception quality of the transmission power is in a saturated state and lower than the target reception quality. Even when a graph of the transmission power versus the reception quality of the UE 103 belonging to first and second subgroups indicates that a saturation start power becomes larger than the transmission power as depicted by a curve 2002 of FIG. 20, the reception quality is considered to be saturated in a state lower than the target reception quality 2001 without being improved to a quality higher than or equal to a certain level. Then, for the UE 103 belonging to first and second subgroups, it may be said that the reception quality does not change even if the transmission power is reduced down to the saturation start power.

Figure 20:
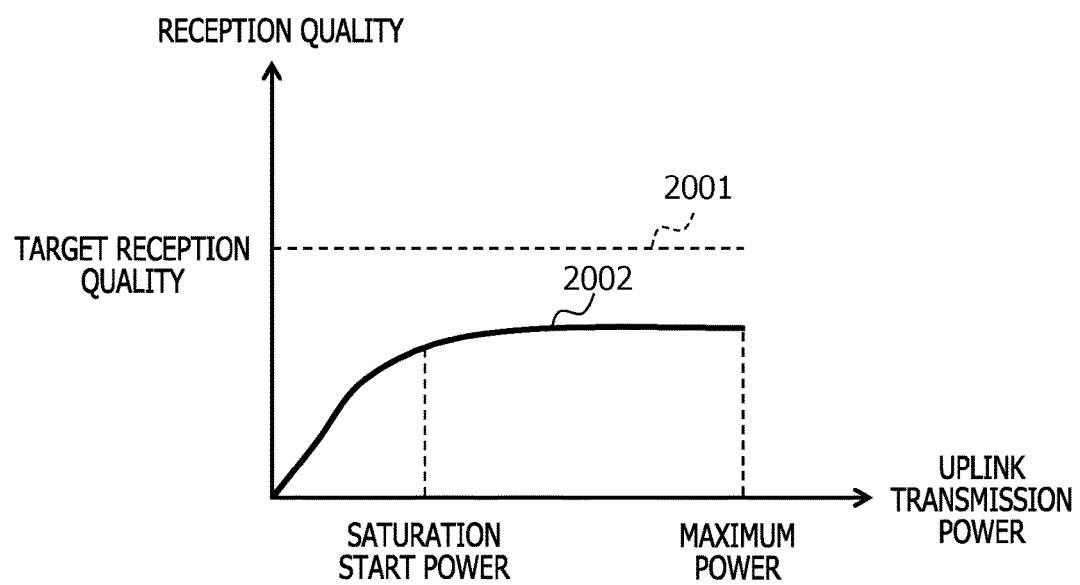
FIG. 20 is a diagram illustrating an example of a graph indicating a relationship between the transmission power of the UE belonging to groups A-1 and A-2 and the reception quality.

In this case, in order to determine a saturation start power for uplink power control of each UE 103, the eNB 101 may monitor a cumulative value f(i), for example, from when uplink power control of each UE 103 starts or when the cumulative value f(i) of the TPC offset value is reset. Then, when a section where variation f(i) is smaller than or equal to the threshold value continues for a predetermined period or longer as illustrated in FIG. 20, it may be considered that the transmission power with the variation smaller than or equal to the threshold value corresponds to the saturation start power.

As such, when performing the group control, the group control information generation unit 1402 may generate the group control information configured to reduce the transmission power of the UE 103 belonging to the group A-1 down to a value x1 obtained by adding Δ1 to the saturation start power and transmit to the eNB 101. Δ1 may be, for example, 0 [dBm]. For UEs 103 belonging to the group A-1, the transmission power is the maximum, and possibility that the transmission power is an uplink interference signal source is higher than UEs 103 belonging to other groups. Thus, group control of the transmission power of UEs 103 belonging to the group A-1 may be performed prior to other groups and subgroups.

When performing the group control, the group control information generation unit 1402 may generate group control information configured to reduce the transmission power of the UE 103 belonging to the group A-2 down to a value x2 obtained by adding Δ2 to the above value x1 and transmit to the eNB 101. Δ2 may be 0 [dBm], or may be selected such that a power determined by the value x2 becomes a half of the power reduction amount in the group A-1. The group control of the transmission power of the UE 103 belonging to the group A-2 may be performed next to the UE 103 belonging to the group A-1 prior to other groups.

When performing the group control, the group control information generation unit 1402 may generate group control information configured to reduce the transmission power of the UE 103 belonging to the group B down to a value x3 obtained by adding Δ3 to the above value x2 and transmit to the eNB 101. Δ3 may be selected such that a power determined by the value x3 becomes a half of the power reduction amount in the group A-1, or may be selected such that the power reduction amount becomes 0 [dBm]. More specifically, the transmission power of the UE 103 belonging to the group B may not be reduced. The group control of the transmission power of the UE 103 belonging to the group B may be performed next to the UE 103 belonging to the group A-2 prior to other groups.

To respond to the control by the group control information, the eNB 101 may store, for example, information related to a table illustrated in FIG. 21 into a storage device such as a memory 3111 (described later with reference to FIG. 31B). The table illustrated in FIG. 21 is a table with rows of "saturation start power" and "target transmission power" added to the table illustrated in FIG. 10. The row of "saturation start power" stores a transmission power causing the reception quality of the UE 103 belonging to the first subgroup to start saturation. To calculate a transmission power causing start of the saturation, variation of the reception quality relative to a change in the transmission power of the UE 103 from the time when power control of respective UEs 103 starts (or when transmission power offset is reset) is measured. In a case where a period when variation of the reception quality relative to a change in the transmission power is smaller than or equal to a predetermined amount continues longer than or equal to a predetermined period of time, a transmission power causing variation of the reception quality relative to a change in the transmission power to start to decrease to be smaller than or equal to a predetermined amount is assumed as the saturation start power.

The row of "target transmission power" stores a target value of the transmission power of the UE 103 when the group control is performed and the transmission power is limited. For a UE 103 of which transmission power is not limited, a value (for example, NULL value) representing that the transmission power is not limited is stored.

Figure 22:
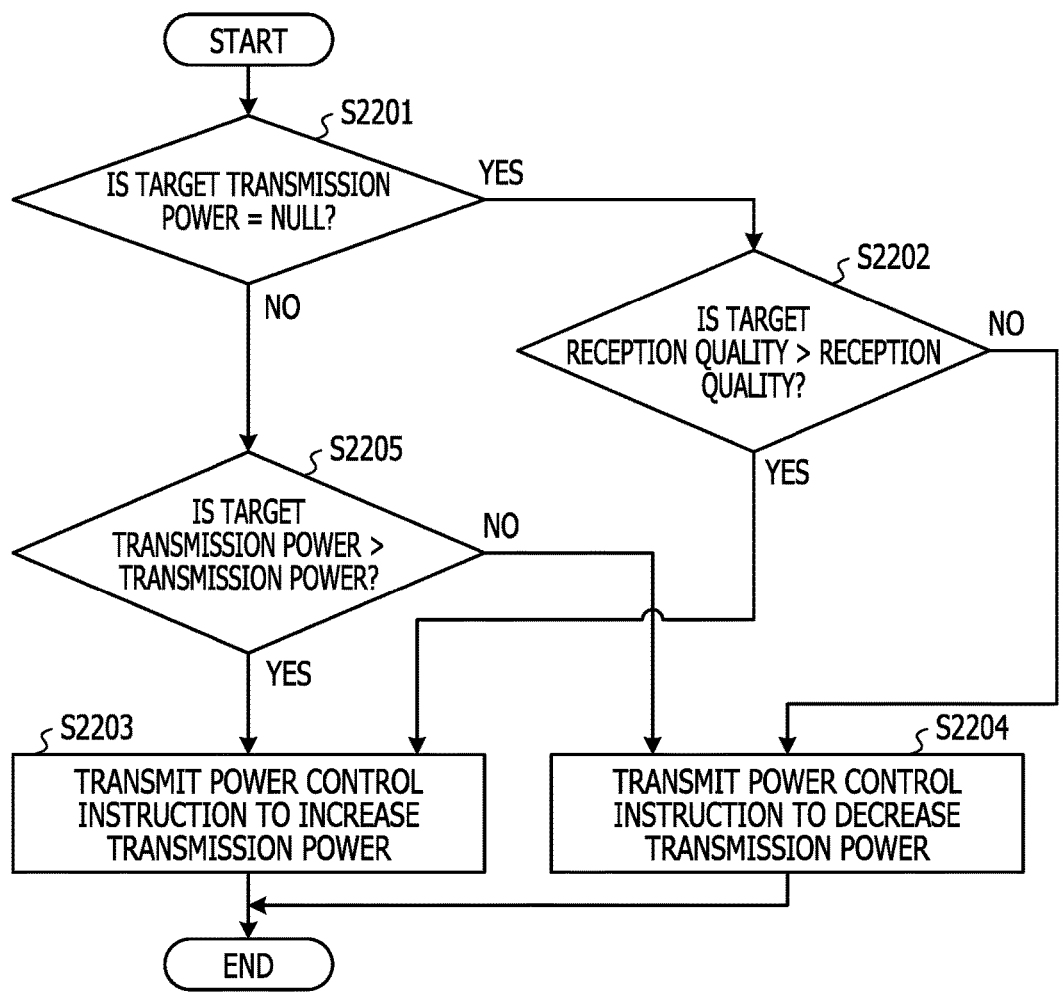
FIG. 22 is a flowchart of a processing of group control to individual UEs when the group control of four groups is performed.

FIG. 22 is a flowchart of a processing of power control to individual UEs 103 when the group control of four groups is performed by the eNB 101 according to the present embodiment. In step S2201, it is determined whether the target transmission power is NULL.

When the target transmission power is NULL (step S2201: YES), in step S2202, the transmission power control unit 904 determines whether the reception quality is inferior to the target reception quality. When the reception quality is inferior to the target reception quality (step S2202: YES), the transmission power control unit 904 proceeds the processing to step S2203 and the transmission unit 905 transmits the power control instruction to increase the transmission power. When the reception quality is not inferior to the target reception quality (step S2202: NO), the transmission power control unit 904 proceeds the processing to step S2204, and the transmission unit 905 transmits the power control instruction to decrease the transmission power.

When the target transmission power is not NULL (step S2201: NO), in step S2205, the transmission power control unit 904 determines whether the transmission power is smaller than the target transmission power. When the transmission power is smaller than the target transmission power (step S2205: YES), the transmission power control unit 904 proceeds the processing to step S2203. When the transmission power is not smaller than the target transmission power (step S2205: NO), the transmission power control unit 904 proceeds the processing to step S2204.

As described above, in the present embodiment, the transmission power is further controlled based on the saturation start power in addition to effects of the first embodiment. Therefore, the transmission power may be reduced without deteriorating the reception quality.

Third Embodiment

As the third embodiment, an embodiment is described in which an amount of interference (reception intensity) of a signal interfering with an uplink signal in the eNB 101 is measured and reported to the controller 701, and the group control is performed by the controller 701 as appropriate.

Figure 23:
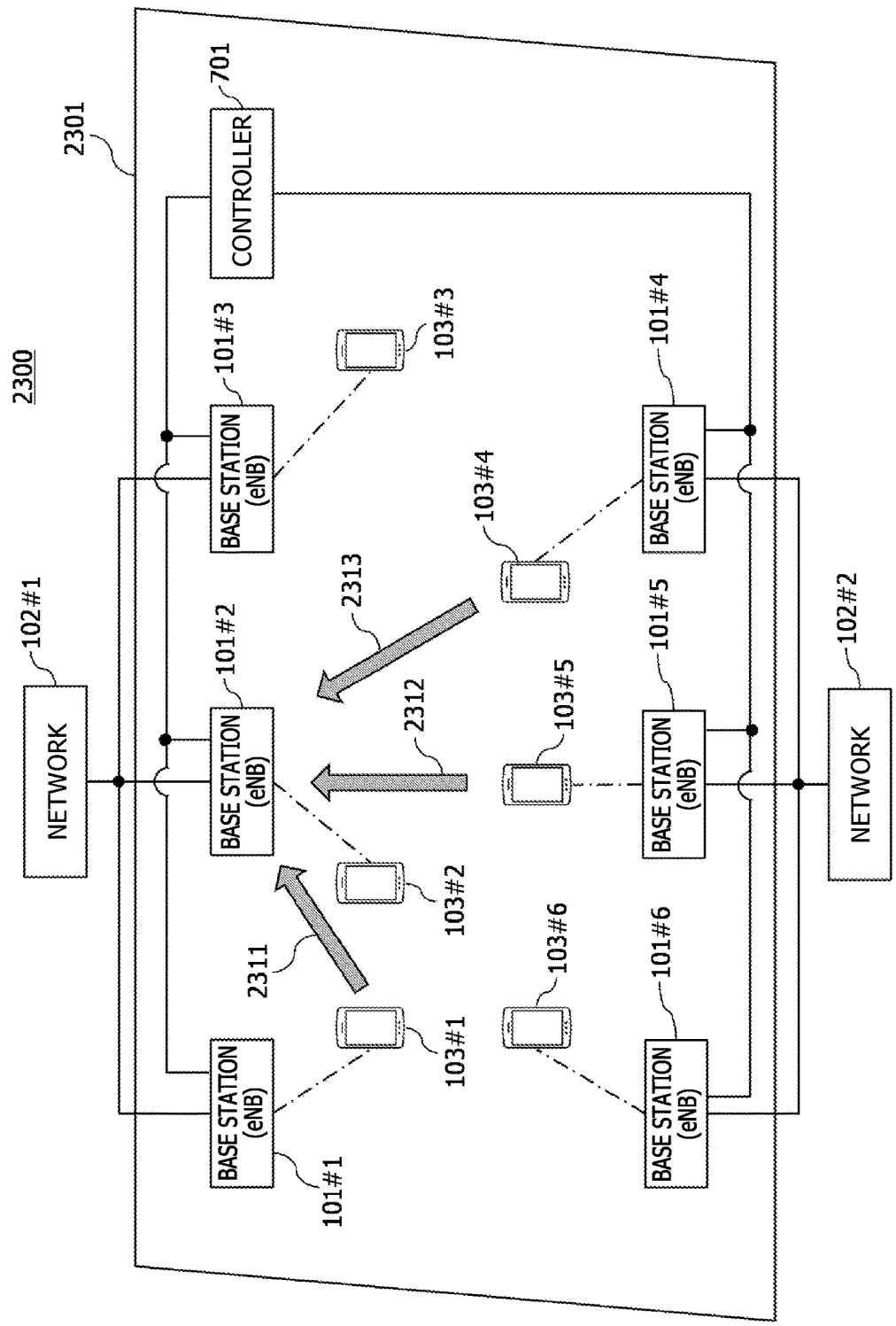
FIG. 23 is an overall configuration view of a radio communication system in a third embodiment.

FIG. 23 is an overall configuration view of a radio communication system 2300 used for describing the third embodiment. The radio communication system 2300 includes eNBs 101#1 to 101#6 disposed in an area (for example, office floor) 2301. eNBs 101#1 to 101#3 are coupled with a network 102#1, and eNBs 101#4 to 101#6 are coupled with a network 102#2. Networks 102#1 and 102#2 may be the same network. Also, eNBs 101#1 to 101#6 are coupled with the controller 701. eNBs 101#1 to 101#6 may be coupled with the controller 701 via networks 102#1 and 102#2.

As indicated by a single dot chain line, each of eNBs 101#1 to 101#6 communicates with each of UEs 103#1 to 103#6. In this arrangement, assume that UEs 103#1, 103#4, and 103#5 are located close to the eNB 101#2 and act as an interference signal source of the uplink signal transmitted to the eNB 101#2 by the UE 103#2 (see reference signs 2311 to 2313).

Figure 24:
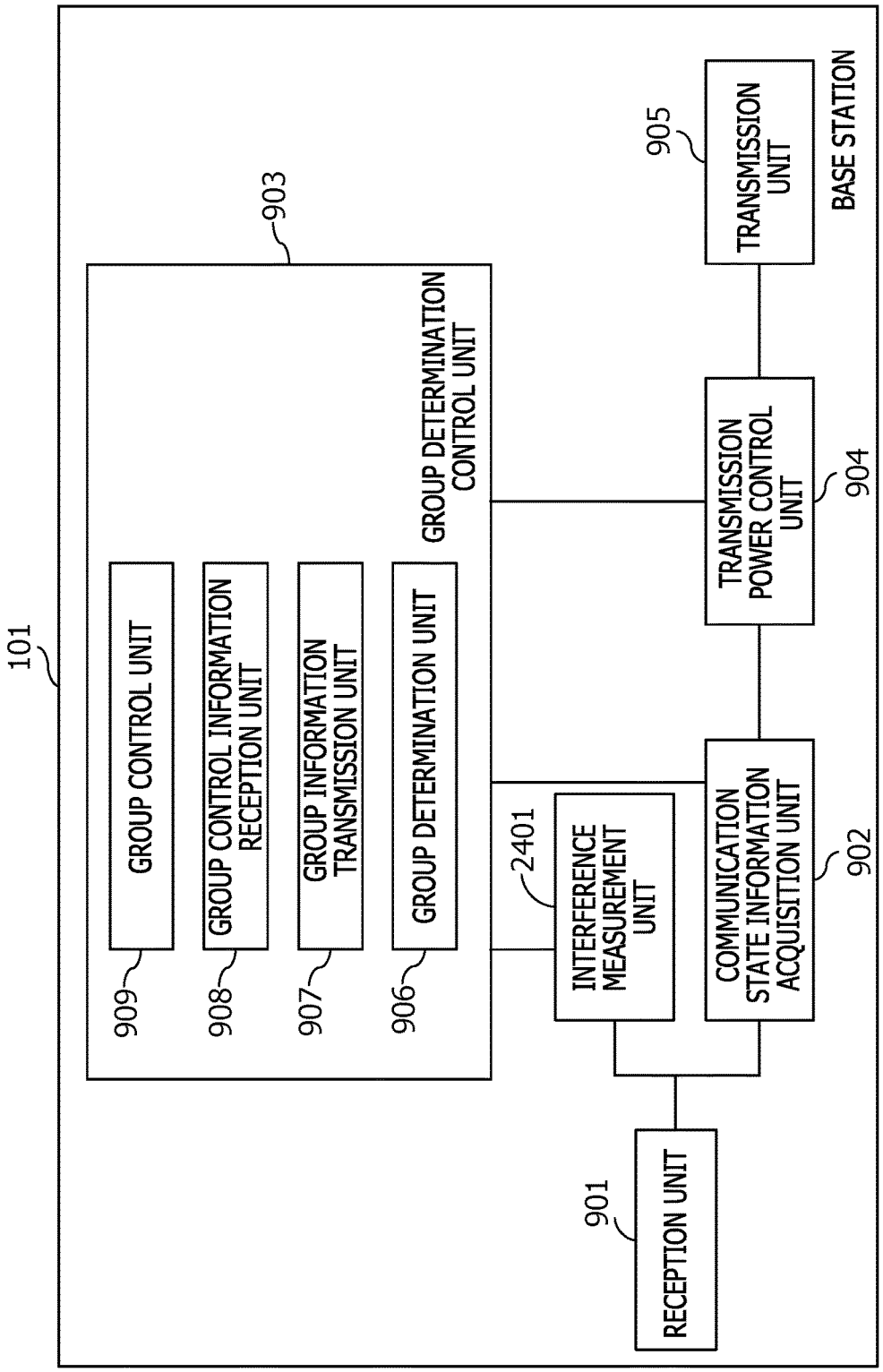
FIG. 24 is a functional block diagram of the eNB in the third embodiment.

FIG. 24 is a functional block diagram of the eNB 101 in the third embodiment. In the third embodiment, the eNB 101 includes an interference measurement unit 2401 added to the eNB 101 in the first or second embodiment, the interference measurement unit being configured to measure intensity of the interference signal contained in the uplink signal received by the reception unit 901. The intensity may be obtained by measuring a reception power in an uplink transmission band of the eNB 101 and a desired wave signal power of respective UEs 103 performing uplink communication with the eNB 101 and subtracting the desired wave signal power from total power. In this case, the desired wave signal power of respective UEs may be calculated by subtracting a propagation loss between the UE 103 and eNB 101 from the uplink transmission power of respective UEs 103.

Figure 25:
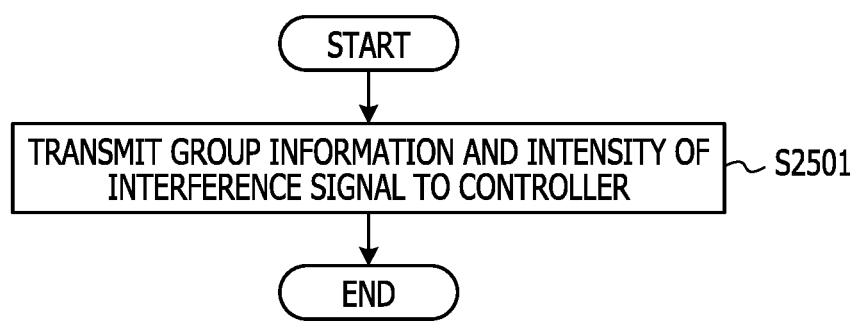
FIG. 25 illustrates an example of a flowchart of a processing of a group determination control unit of the eNB in the third embodiment.

In the present embodiment, intensity of the interference signal measured by the interference measurement unit 2401 is transmitted to the group determination control unit 903 and then transmitted to the controller 701 by the group information transmission unit 907. FIG. 25 illustrates an example of a flowchart of a processing by the group determination control unit 903 of the eNB 101 in the present embodiment. In step S2501, the group determination control unit 903 transmits the group information and intensity of the interference signal to the controller 701.

FIG. 26 is a diagram in a table format illustrating an example of information indicating the number of UEs 103 belonging to respective groups for each of eNBs 101 in the third embodiment. Configuration of the controller 701 in the present embodiment is the same as in the first or second embodiment. However, the controller 701 is configured such that upon receiving the group information and intensity of the interference signal, the group information reception unit 1401 (see FIG. 14) of the controller 701 stores intensity of the interference signal into a table illustrated in FIG. 26 by associating with identification information of the eNB 101. In other words, the base station ID and an amount of interference are associated with each other and stored in the table illustrated in FIG. 26. Although the table illustrated in FIG. 26 indicates that the number of terminals of groups A to C is stored by associating with identification information of each of eNBs 101, the number of terminals of groups A-1, A-2, B, and C may be associated and stored as in the second embodiment.

Figure 27:
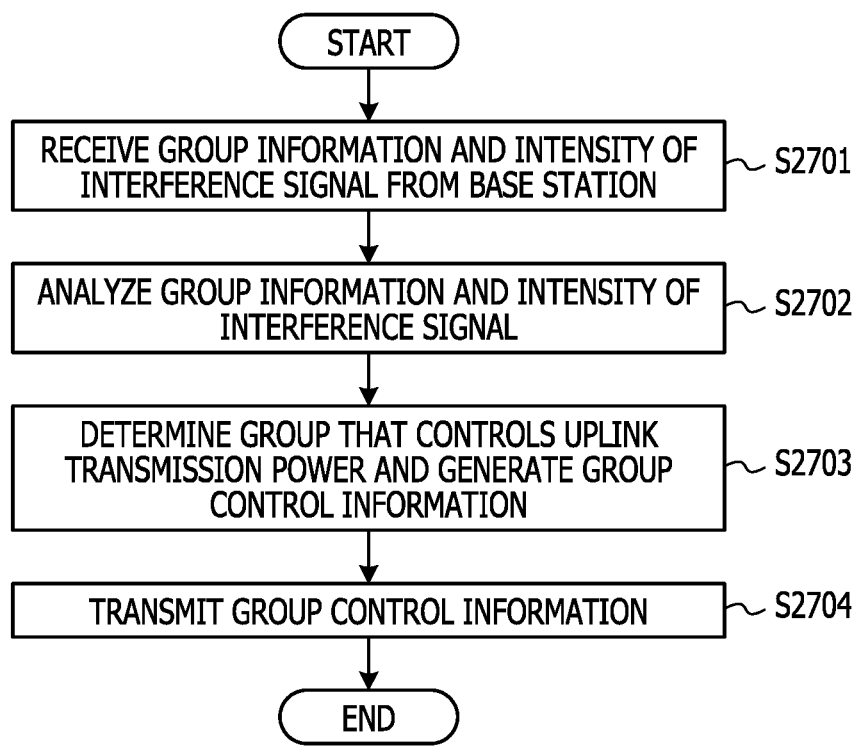
FIG. 27 is a flow chart of a processing of the controller in the third embodiment.

FIG. 27 is a flow chart illustrating a processing of the controller 701 in the present embodiment. In step S2701, the group information reception unit 1401 receives the group information and intensity of the interference signal from the eNB 101. In step S2702, the group control information generation unit 1402 analyzes the group information and intensity of the interference signal. For example, in addition to analyses of the first or second embodiment, the group control information generation unit 1402 analyzes whether intensity of the interference signal exceeds a predetermined value (allowable amount). In step S2703, the controller 701 determines the group controlling the transmission power based on the analysis result in step S2702, and generates the group control information. For example, in a case where there exists an eNB 101 with intensity of the interference signal exceeding a predetermined value, the controller 701 generates group control information for causing the other eNB 101 to perform the group control. The other eNB 101 may be an eNB 101 located around an eNB 101 with intensity of the interference signal exceeding a predetermined value. This inhibits deterioration of the communication quality of a UE 103 communicating with an eNB 101 apart from an eNB 101 with intensity of the interference signal exceeding a predetermined value. In step S2704, the controller 701 transmits the group control information generated in step S2703.

Once started the group control in the eNB 101, the controller 701 continuously receives the group information and an amount of interference from the eNB 101 and analyzes. Consequently, when the amount of interference in each eNB 101 is smaller than or equal to the allowable amount or when the group information satisfies a predetermined condition, the controller 701 ends the group control. Satisfaction of a predetermined condition by the group information may correspond to a state where the number of UEs 103 belonging to the group A is smaller than or equal to a predetermined value. Alternatively, the condition may correspond to a state where the number of UEs 103 belonging to groups A and B is smaller than or equal to a predetermined value. In a case where there is a subgroup in the group A, "number of UEs 103 belonging to group A" in the condition may be replaced with "number of UEs 103 belonging to groups A-1 and A-2".

In the present embodiment, the group control is performed based on intensity of the interference signal measured by the eNB 101, that is, the group control is performed by detecting that the amount of interference in the eNB 101 actually exceeds the allowable amount. Therefore, more accurate control is possible. For example, as illustrated in FIG. 23, the eNB 101#2 measures the amount of interference from three UEs including UE 103#1, 103#4, and 103#5 with the interference measurement unit 2401, transmits to the controller 701, and reports to the controller 701 that the amount of interference exceeds the allowable amount.

As a modified example of the third embodiment, when measured intensity of the interference signal by respective eNBs 101 exceeds the allowable value, the group control may be requested by the eNB 101 to the controller 701.

Figure 28:
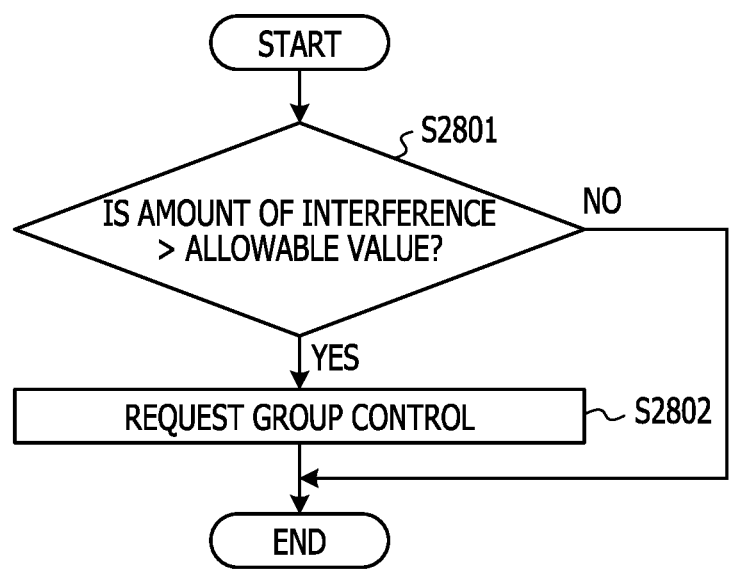
FIG. 28 illustrates an example of a flowchart of a processing of a group control request by the eNB in a modified example of the third embodiment.

FIG. 28 illustrates an example of a flowchart of a processing of a group control request by the eNB 101 in a modified example of the third embodiment. As illustrated in FIG. 28, every time the interference measurement unit 2401 measures intensity of the interference signal, each of eNBs 101 determines whether the amount of interference exceeds the allowable value (step S2801). If the amount of interference does not exceed the allowable value (step S2801: NO), the processing ends. If intensity of the interference signal exceeds the allowable amount (step S2801: YES), the eNB 101 requests the group control to the controller 701 (step S2802).

Thus, as the eNB 101 measures the amount of interference and requests the group control when intensity of the interference signal exceeds the allowable value, transmitting intensity of the interference signal is not requested when transmitting the group information, and thereby amount of the transmission data may be reduced. Also, as the group control is performed when intensity of the interference signal actually exceeds the allowable amount, the group control is implemented when requested, and unrequested group control may be suppressed.

Figure 29:
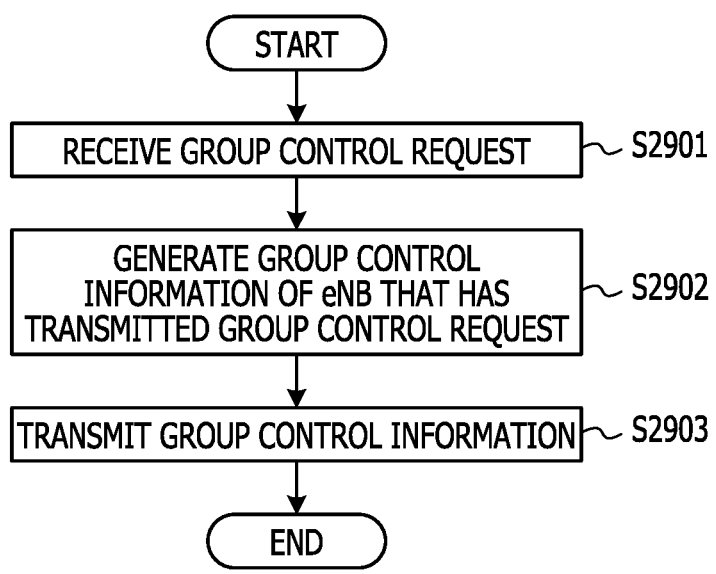
FIG. 29 is a flowchart of a processing of the controller in a modified example of the third embodiment.

FIG. 29 is a flowchart of a processing of the controller 701 in a modified example of the third embodiment. In step S2901, the group information reception unit 1401 receives the group control request from the eNB 101. In step S2902, the group control information generation unit 1402 generates the group control information for eNBs 101 around an eNB 101 that has transmitted the group control request. In step S2903, the group control information transmission unit 1403 transmits the group control information to eNBs 101 around an eNB 101 that has transmitted the group control request.

Figure 30:
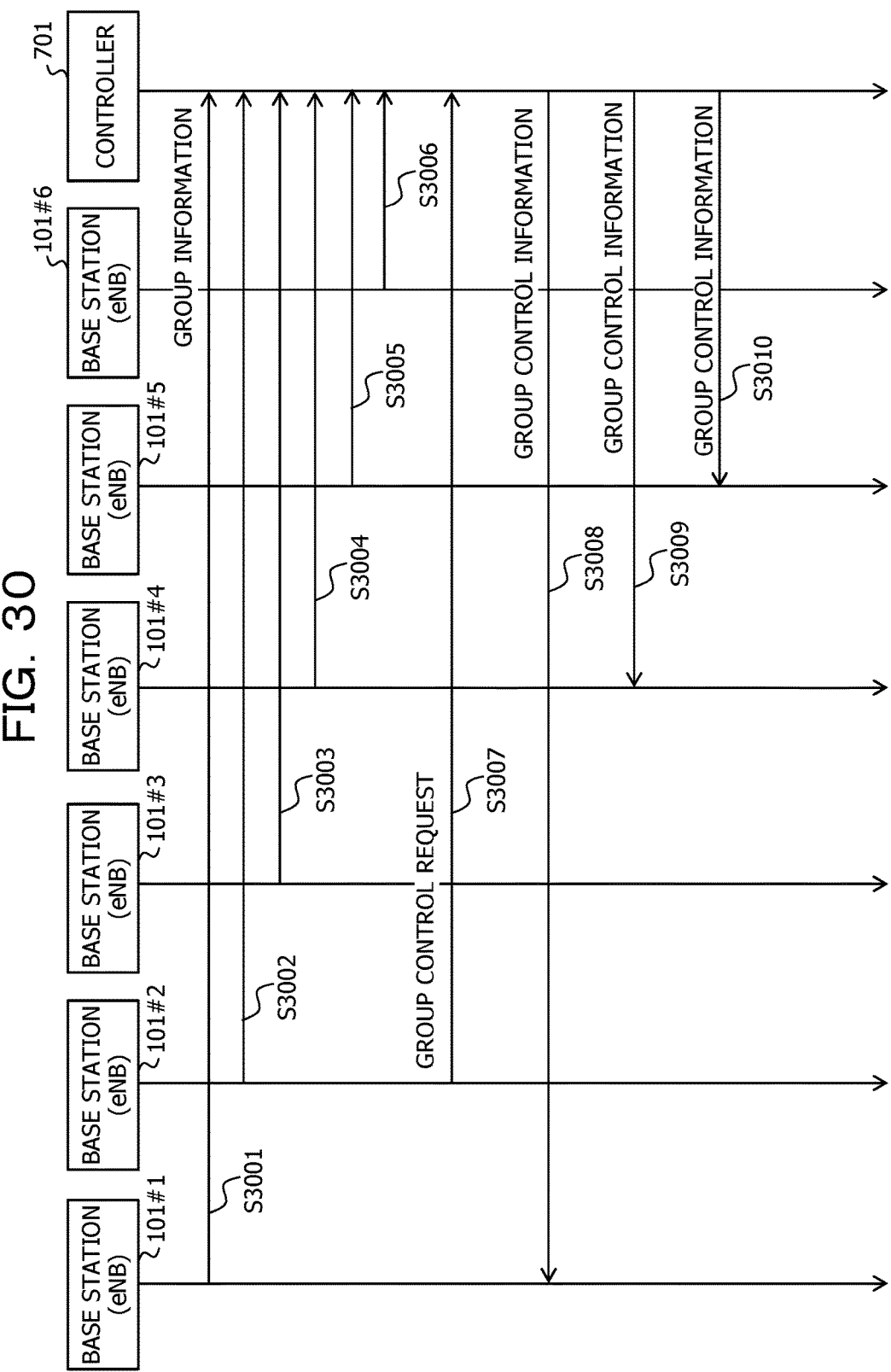
FIG. 30 is a sequence diagram of a communication between the eNB and controller of a radio communication system in a modified example of the third embodiment.

FIG. 30 is a sequence diagram of communication between eNBs 101#1 to 101#6 and controller 701 of a radio communication system 2300 in a modified example of the third embodiment.

In steps S3001 to S3006, the group information is transmitted from each of eNB 101#1 to 101#6 to the controller 701. Assume that after analyzing the group information received in steps S3001 to S3006, the controller 701 determines that there is no failure of the uplink communication performance, and therefore the group control information is not generated in this timing.

However, if the amount of interference in the eNB 101#2 actually exceeds the allowable amount, in step S3007, the eNB 101#2 transmits the group control request to the controller 701.

Upon receiving the group control request, the controller 701 analyzes the group information again and determines that UEs 103#1, 103#4, and 103#5 communicating with eNBs 101#1, 101#4, and 101#5 are interference signal sources. Instead of analyzing the group information again, the controller 701 may request the group information to eNBs 101#1 to 101#6, and determine the interference signal source by analyzing the received group information. As a result, in steps S3008, S3009, and S3010, the group control information is transmitted to eNBs 101#1, 101#4, and 101#5, and the group control is performed in each of eNBs 101#1, 101#4, and 101#5.

(Hardware Configuration)

Figures 31A, 31B, 31C:
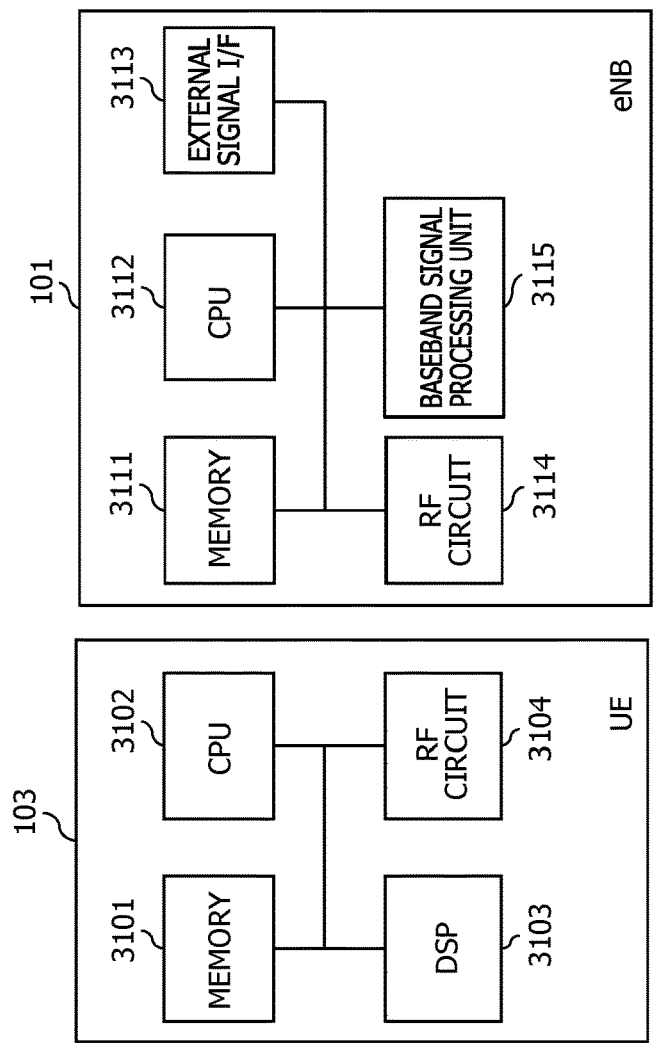
FIG. 31A is a hardware configuration view of the UE.
FIG. 31B is a hardware configuration view of the eNB.
FIG. 31C is a hardware configuration view of the controller.

FIG. 31A is a hardware configuration diagram of the UE 103. The UE 103 includes a memory 3101, a CPU 3102, a DSP 3103, and an RF circuit 3104. The CPU is an abbreviation for the central processing unit, the DSP is an abbreviation for the digital signal processor, and the RF is an abbreviation for the radio frequency. The memory 3101 stores a program executed for various settings and by the CPU 3102. The RF circuit 3104 converts a radio signal and a base band signal (electric signal) transmitted and received via an antenna (not illustrated) to each other. The DSP 3103 is a processor configured to implement a predetermined signal processing (for example, termination of transmitted and received signals and conversion of communication protocol) of the electric signal.

Programs executed by the CPU 3102 may include a program for controlling the transmission power of the RF circuit 3104 in response to the power control instruction received by the reception unit 801 (see FIG. 8). The UE 103 may be configured with hardware such as the field programmable gate array (FPGA) instead of executing the program by the CPU 3102 and using software.

FIG. 31B is a hardware configuration diagram of the eNB 101. The eNB 101 includes a memory 3111, a CPU 3112, an external signal interface (I/F) 3113, an RF unit 3114, and a baseband signal processing unit 3115. The memory 3111 stores a program executed for various settings and by the CPU 3112. The memory 3111 also stores data equivalent to the table illustrated in FIG. 10 or FIG. 21. The external signal I/F 3111 is an interface for a program executed by the CPU 3112 to exchange various data with the network 102 and controller 701. The RF unit 3114 converts a radio signal and a base band signal (electric signal) communicated via an antenna (not illustrated) to each other. The baseband signal processing unit 3115 is a processor configured to implement a predetermined signal processing (for example, termination of transmitted and received signals and conversion of communication protocol) of the electric signal.

Programs executed by the CPU 3112 include a program for implementing functions of the communication state information acquisition unit 902, group determination control unit 903, and transmission power control unit 904 (see FIG. 9). In the same manner as described for the UE 103, the eNB 101 may be configured by using hardware such as FPGA instead of software.

FIG. 31C illustrates a hardware configuration of the controller 701. The controller 701 includes a memory 3121, a CPU 3122, a secondary storage device 3123, an external signal I/F 3124, and an administrator I/F 3125. The memory 3121 stores a program executed by the CPU 3122. The secondary storage device 3123 is a device configured to store information and programs permanently. Information and programs stored in the secondary storage device 3123 are loaded into the memory 3121 as appropriate. The secondary storage device 3123 also stores information stored in the memory 3121. Data stored in the memory 3121 and secondary storage device 3123 may include information related to a table illustrated in FIG. 15 or FIG. 26. The external signal I/F 3124 is an interface for communicating with the eNB 101. For example, the group information and group control information are communicated with the eNB 101. The administrator I/F 3125 provides an interface (display of display unit, input through keyboard, and so on) for the administrator of the controller 701 to operate the controller 701.

Programs executed by the CPU 3122 include a program for implementing a function of the group control information generation unit 1402 (see FIG. 14). The controller 701 may be configured by using hardware such as FPGA instead of software.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of controlling power comprising:
based on a reception quality of an uplink signal from a first terminal device to a first base station and a transmission power of the uplink signal from the first terminal device, performing, by the first base station, a determination process to determine to which group the first terminal device belongs among a plurality of groups set based on the reception quality and the transmission power, when the transmission power is greater than a first value and the reception quality is less than a second value;
transmitting, by the first base station, a result of the determination process to a control apparatus;
when the result of the determination process indicates that the first terminal device belongs to a first group of the plurality of groups, transmitting, by the control apparatus to the first base station, control information set for the first group, the control information indicating a method of controlling a transmission power of the uplink signal; and
controlling, by the first base station, the transmission power of the uplink signal of the first terminal device based on the control information, wherein in the controlling of the transmission power of the uplink signal based on the control information, the first base station is configured to instruct the first terminal device to reduce the transmission power of the uplink signal regardless that the reception quality is less than the second value.

2. The method according to claim 1, wherein
the control apparatus causes the first base station to control the transmission power of the uplink signal of the first terminal device prior to transmission power of an uplink signal of a second terminal device belonging to a second group of the plurality of groups.

3. The method according to claim 2, wherein the control apparatus causes a second base station communicating with the second terminal device belonging to the second group not to execute control of the transmission power of the uplink signal of the second terminal device.

4. The method according to claim 3, wherein the transmission power of the uplink signal of the second terminal device is greater than or equal to the first value and the reception quality of the uplink signal of the second terminal device in the second base station is greater than or equal to a third value.

5. The method according to claim 4, wherein the second value is a reference quality value of the reception quality set for the first terminal device, and the third value is reference quality value of the reception quality set for the second terminal device.

6. The method according to claim 2, further comprising:
causing, by the control apparatus, the second base station communicating with the second terminal device to execute control of the transmission power of the uplink signal of the second terminal device prior to control of a transmission power of an uplink signal of a third terminal device belonging to a third group among the plurality of groups, wherein the transmission power of the uplink signal of the third terminal device is less than the first value.

7. The method according to claim 1, wherein:
when a plurality of terminal devices including the first terminal device belong to the first group, the control apparatus determines that a terminal device where the transmission power is the maximum among the plurality of terminal devices belongs to a first subgroup, and that a terminal device where the transmission power is not the maximum among the plurality of terminal devices belongs to a second subgroup; and
the transmission power of the terminal device belonging to the first subgroup is controlled prior to the terminal device belonging to the second subgroup.

8. The method according to claim 1, further comprising:
identifying, by the first base station, an amount of interference to the uplink signal of the first terminal device;
transmitting, by the first base station, a notification to the control apparatus when the amount of interference exceeds a fourth value;
receiving, by the control apparatus, notifications from a plurality of base stations including the first base station; and
when the number of notifications received by the control apparatus exceeds a first number, causing, by the control apparatus, the first base station to limit the transmission power of the uplink signal of the first terminal device.

9. A wireless communication system comprising:
a first base station, and
a control apparatus including a memory and a processor coupled to the memory, wherein:
based on a reception quality of an uplink signal from a first terminal device to the first base station and a transmission power of the uplink signal from the first terminal device, the first base station is configured to perform a determination process to determine to which group the first terminal device belongs among a plurality of groups set based on the reception quality and the transmission power, when the transmission power is greater than a first value and the reception quality is less than a second value, and to transmit a result of the determination process to a control apparatus,
when the result of the determination process indicates that the first terminal device belongs to a first group of the plurality of groups, the processor is configured to transmit control information set for the first group to the first base station, the control information indicates a method of controlling a transmission power of the uplink signal, and
the first base station is configured to control the transmission power of the uplink signal of the first terminal device based on the control information, wherein in the controlling of the transmission power of the uplink signal based on the control information, the first base station is configured to instruct the first terminal device to reduce the transmission power of the uplink signal regardless that the reception quality is less than the second value.

10. The wireless communication system according to claim 9, wherein
the processor is further configured to cause the first base station to control the transmission power of the uplink signal of the first terminal device prior to transmission power of an uplink signal of a second terminal device belonging to a second group of the plurality of groups.

11. The wireless communication system according to claim 10 further comprising a second base station, wherein the processor is further configured to cause the second base station communicating with the second terminal device belonging to the second group not to execute control of the transmission power of the uplink signal of the second terminal device.

12. The wireless communication system according to claim 11, wherein the transmission power of the uplink signal of the second terminal device is greater than or equal to the first value and the reception quality of the uplink signal of the second terminal device in the second base station is greater than or equal to a third value.

13. The wireless communication system according to claim 10, wherein:
   the processor is configured to cause the second base station communicating with the second terminal device to execute control of the transmission power of the uplink signal of the second terminal device prior to control of a transmission power of an uplink signal of a third terminal device belonging to a third group among the plurality of groups, and
   the transmission power of the uplink signal of the third terminal device is less than the first value.

14. The wireless communication system according to claim 12, wherein the second value is a reference quality value of the reception quality set for the first terminal device, and the third value is a reference quality value of the reception quality set for the second terminal device.

15. The wireless communication system according to claim 9, wherein:
   when a plurality of terminal devices including the first terminal device belong to the first group, the processor is configured to determine that a terminal device where the transmission power is the maximum among the plurality of terminal devices belongs to a first subgroup, and that a terminal device where the transmission power is not the maximum among the plurality of terminal devices belongs to a second subgroup, and
   the transmission power of the terminal device belonging to the first subgroup is controlled prior to the terminal device belonging to the second subgroup.

16. The wireless communication system according to claim 9, wherein:
   the first base station is configured to:
      identify an amount of interference to the uplink signal of the first terminal device, and
      transmit a notification to the control apparatus when the amount of interference exceeds a fourth value, and
   the processor is configured to:
      receive notifications from a plurality of base stations including the first base station, and
      when the number of notifications received by the control apparatus exceeds a first number, cause the first base station to limit the transmission power of the uplink signal of the first terminal device.

\* \* \* \* \*